US012710288B2

(12) United States Patent
Choi et al.

(10) Patent No.: US 12,710,288 B2
(45) Date of Patent: Aug. 18, 2026

(54) METHOD AND SYSTEM FOR PROVIDING INDOOR MAP

(71) Applicant: KAKAO CORP., Jeju-si (KR)

(72) Inventors: Youngjin Choi, Seongnam-si (KR); Ahrum Kang, Seongnam-si (KR); Hyoju Choi, Seongnam-si (KR); Sung Bum Park, Seongnam-si (KR); Hyunhee Joe, Seongnam-si (KR); Binnara Lee, Seongnam-si (KR); Jaiwuk Chung, Seongnam-si (KR); Keunhui Park, Seongnam-si (KR); Deok Gon Lee, Seongnam-si (KR); Dongyoung Yoon, Seongnam-si (KR); Gyeong-Hyeon Moon, Seongnam-si (KR); Daehyun Im, Seongnam-si (KR); Hyungchul Shin, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 45 days.

(21) Appl. No.: 19/026,008

(22) Filed: Jan. 16, 2025

(65) Prior Publication Data

US 2025/0244147 A1 Jul. 31, 2025

(30) Foreign Application Priority Data

Jan. 25, 2024 (KR) ........................ 10-2024-0011348

(51) Int. Cl.
*G01C 21/00* (2006.01)

(52) U.S. Cl.
CPC ...... *G01C 21/3885* (2020.08); *G01C 21/3811* (2020.08)

(58) Field of Classification Search
CPC ........... G01C 21/3885; G01C 21/3811; G01C 21/206; G01C 21/383; G01C 21/367; G01C 21/3682; G01C 21/387; G06F 16/9537; G06Q 50/10
See application file for complete search history.

(56) References Cited

U.S. PATENT DOCUMENTS 8,823,734 B1 * 9/2014 Bailiang .................. G09G 5/34 345/672
10,753,762 B2 * 8/2020 Shelby .................... G06F 16/00
2009/0043504 A1 * 2/2009 Bandyopadhyay ..... G01S 19/49 701/469

(Continued)

*Primary Examiner* — Richard M Camby
(74) *Attorney, Agent, or Firm* — Seed Intellectual Property Law Group LLP

(57) ABSTRACT

A method of providing an indoor map is provided. The method includes transmitting, the background map information to a user terminal, wherein the background map information includes a background map and a plurality of first points of interest (POIs), receiving a request for indoor map detail information for at least one first POI, which is a display target of an indoor map, determining, based on priority values of the plurality of first POIs and priority values of a plurality of second POIs of the indoor map of the at least one first POI, one or more third POIs to be displayed on a map screen, and transmitting the indoor map detailed information to the user terminal, wherein the indoor map detailed information includes floor polygon information of the first POI, which is a display target of the indoor map, and the determined one or more third POIs.

20 Claims, 13 Drawing Sheets

(56) References Cited

U.S. PATENT DOCUMENTS

| | | | | |
|---|---|---|---|---|
| 2009/0171576 | A1* | 7/2009 | Kim | G01C 21/3682 455/418 |
| 2012/0197524 | A1* | 8/2012 | Beyeler | G01C 21/3476 701/426 |
| 2012/0197714 | A1* | 8/2012 | Beyeler | G01C 21/3676 705/14.49 |
| 2014/0223360 | A1 | 8/2014 | Bailiang | |
| 2015/0369623 | A1 | 12/2015 | Blumenberg et al. | |
| 2018/0348985 | A1* | 12/2018 | Shelby | G01C 21/206 |
| 2023/0152118 | A1 | 5/2023 | Shelby et al. | |

* cited by examiner

| Name | Priority value |
|---|---|
| CCTV | 4030 |
| Accident information | 4020 |
| Major cities and counties | 4010 |
| Favorite POI | 3000 |
| Indoor map POI | 2110 |
| Indoor map background | 2100 |
| Bus facility | 2030 |
| Railway station | 2020 |
| Bicycle road facility | 260 |
| Bicycle road name | 210 |
| Railway station exit | 200 |
| Affiliated brand | 190 |
| General POI | 180 |
| APT building number | 170 |
| Road name | 150 |

FIG. 11A

| Indoor map POI | Popularity |
|---|---|
| A store | 90 |
| B store | 30 |
| C store | 40 |
| D restaurant | 60 |
| E restaurant | 10 |
| F beauty shop | 50 |
| G beauty shop | 20 |
| H café | 80 |
| I café | 70 |
| J supermarket | 100 |

FIG. 11B

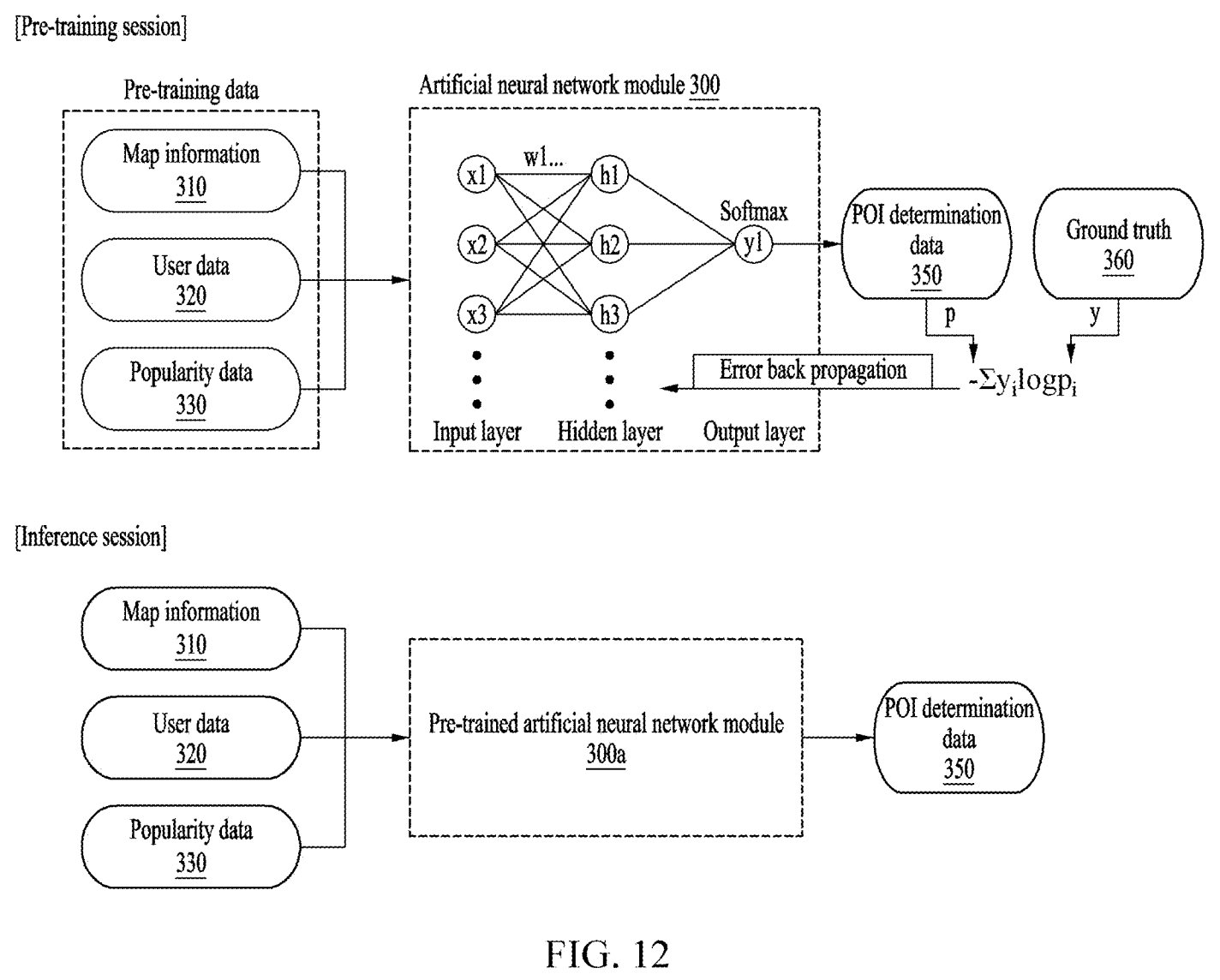

[Pre-training session]

Pre-training data

Map information 310

User data 320

Popularity data 330

Artificial neural network module 300 w1...

x1 x2 x3 h1 h2 h3 y1

Softmax

Input layer

Hidden layer

Output layer

Error back propagation

POI determination data 350 p

Ground truth 360 y $-\Sigma y_i \log p_i$

[Inference session]

Map information 310

User data 320

Popularity data 330

Pre-trained artificial neural network module 300a

POI determination data 350

FIG. 12

METHOD AND SYSTEM FOR PROVIDING INDOOR MAP

CROSS-REFERENCE TO RELATED APPLICATION

This application claims the benefit of Korean Patent Application No. 10-2024-0011348 filed on Jan. 25, 2024, in the Korean Intellectual Property Office, the entire disclosure of which is incorporated herein by reference for all purposes.

BACKGROUND

Technical Field

One or more embodiments relate to a method and a system for providing an indoor map, and more particularly, to a method and a system for providing an indoor map that renders points of interest (POIs) after contention processing of the POIs when displaying an indoor map on a map screen.

Description of the Related Art

Recently, a change in lifestyle is occurring in which the number of people visiting large shopping malls is increasing, with the term "mall lifestyle zone" appearing, which refers to a place where you can enjoy restaurants, cafes, shopping, and cultural activities all in one place. Large shopping malls that make up a shopping district are made up of large, multi-story buildings or structures. As a structure of a building is complex, there is a demand for customers visiting large shopping malls to easily check an indoor map of such shopping malls.

Accordingly, there is an attempt to use a map of an existing map application (hereinafter, referred to as a "background map" for ease of description) as is but display an indoor map for a specific building or structure.

However, in the case of an indoor map, buildings often consist of multiple floors, and many stores and facilities are densely packed in a limited area, so there are limitations in displaying all points of interest (POIs). In addition, errors or malfunctions that degrade user experience occur during a process of simultaneously showing an indoor map and a background map. For example, when a POI in a background map overlaps an indoor map, a malfunction such as a ghost click may occur, in which a POI in the background map that is not visible on a map screen is incorrectly selected because it is obscured by the indoor map.

Accordingly, when providing an indoor map, it is necessary to improve the user experience by appropriately displaying the POI desired by the user and reducing malfunctions.

BRIEF SUMMARY

Embodiments provide a method of determining a point of interest (POI) to be displayed on a map screen among POIs of an indoor map and a background map.

Embodiments provide a method of improving user experience by providing a more intuitive user interface in a process of displaying an indoor map on a background map and reducing malfunctions or errors that may occur when displaying two maps simultaneously.

The effects to be achieved are not limited to those described above, and other effects not mentioned above will be clearly understood by one of ordinary skill in the art from the following description.

Hereinafter, specific means for achieving the aspects of the present disclosure are described.

According to an aspect, there is provided a method of providing an indoor map including transmitting, in response to a request for background map information, the background map information to a user terminal, wherein the background map information comprises a background map and a plurality of first points of interest (POIs), receiving a request for indoor map detailed information for at least one first POI, among the plurality of first POIs, which is a display target of an indoor map, determining, based on priority values of the plurality of first POIs and priority values of a plurality of second POIs of the indoor map of the at least one first POI, one or more third POIs to be displayed on a map screen, and transmitting the indoor map detailed information to the user terminal, wherein the indoor map detailed information comprises floor polygon information of the first POI, which is a display target of the indoor map, and the determined one or more third POIs.

The request for the indoor map detailed information may include designated floor information for the at least one first POI.

The floor polygon information of the indoor map detailed information may represent, with a shape or a line, a structure of a specific layer of the at least one first POI, and the plurality of second POIs of the indoor map detailed information may include location information associated with a map of each of the second POIs and detailed information on each of the second POIs.

The method of providing an indoor map may further include transmitting, in response to a request for indoor map zone information, the indoor map zone information, wherein the indoor map zone information may include area information and floor information of a building or a structure corresponding to the first POI that is a display target of an indoor map.

The area information included in the indoor map zone information may include a polygon that represents a shape of the indoor map of the first POI, which is a display target of the indoor map, and the floor information included in the indoor map zone information may indicate how many above-ground floors and underground floors are included in the first POI that is a display target of an indoor map.

The priority values assigned to the plurality of second POIs may be set higher than the priority values assigned to the plurality of first POIs so that the plurality of second POIs may be preferentially rendered in an area in which the background map and the indoor map overlap each other.

According to an aspect, there is provided a method of providing an indoor map including displaying, on a map screen, a background map and a plurality of first POIs, transmitting, in response to receiving a user input, a request for indoor map detailed information, receiving the indoor map detailed information, wherein the indoor map detailed information comprises floor polygon information of a first POI, which is a display target of an indoor map, and a plurality of second POIs, determining, based on priority values of the plurality of first POIs and priority values of the plurality of second POIs of the indoor map of the at least one first POI, one or more third POIs to be displayed on the map screen, and rendering and displaying, on the map screen, the determined one or more third POIs and the floor polygon information.

The request for the indoor map detailed information may include designated floor information for the first POI that is a display target of an indoor map.

The user input may cause at least part of the first POI, among the plurality of first POIs, which is a display target of an indoor map, to be within a viewpoint of the map screen and changes a scale level of the map screen to be greater than or equal to a pre-specified level.

The method of providing an indoor map may further include, prior to the transmitting of the request for the indoor map detailed information, requesting, in response to receiving the user input, indoor map zone information, wherein the indoor map zone information may include area information and floor information of a building or a structure corresponding to the first POI that is a display target of an indoor map.

The user input related to the request for the indoor map zone information may be an input that increases a scale level of the map screen to be greater than or equal to a pre-specified level and that causes at least part of the first POIs, for which an indoor map may be displayed, to be within a viewpoint of the map screen.

The determining of the one or more third POIs may include determining the one or more third POIs based on priority values assigned to each of the plurality of first POIs and the plurality of second POIs.

The determining of the one or more third POIs may include performing contention processing based on popularities assigned to each of the plurality of first POIs and the plurality of second POIs.

The popularity may be calculated based on at least one of a number of searches for a POI, a number of requests for a direction to the POI, a number of times the POI is set as a favorite, or a number of times the POI is shared with friends.

The priority values assigned to the plurality of second POIs may be set higher than the priority values assigned to the plurality of first POIs so that the plurality of second POIs may be preferentially rendered in an area in which the background map and the indoor map overlap each other.

The priority values assigned to a public facility and a convenience facility displayed within the floor polygon information may be higher than the priority values assigned to the plurality of second POIs.

The method may further include determining whether a plurality of second POIs and a plurality of first POIs displayed on the map screen after the user input overlap each other, wherein the determining of the one or more third POIs may be performed when it is determined that the plurality of first POIs and the plurality of second POIs overlap each other.

The transmitting of the request for the indoor map detailed information may include, when there are two or more first POIs, for which an indoor map may be displayed, within the viewpoint of the map screen having the scale level higher than or equal to a pre-specified level, transmitting the request for indoor map detailed information of a first POI closest to a center of the map screen.

The determining of the one or more third POIs may be repeatedly performed whenever the map screen is updated.

According to an aspect, there is provided a system including a server and a user terminal. The server includes a map database configured to store map information and a map service providing module configured to obtain map information from the map database and provide the map information to a user terminal. The map service providing module is configured to transmit, in response to a request for background map information from the user terminal, the background map information to the user terminal, wherein the background map information comprises a background map and a plurality of first POIs, in response to a request for indoor map detailed information for at least one first POI, among the plurality of first POIs received from the user terminal, which is a display target of an indoor map, determine one or more third POIs to be displayed on a map screen, based on priority values of the plurality of first POIs and priority values of a plurality of second POIs of the indoor map of the at least one first POI, and transmit indoor map detailed information to the user terminal, wherein the indoor map detailed information comprises floor polygon information of the first POI, which is a display target of an indoor map, and the plurality of second POIs. The user terminal includes a contention processing portion configured to determine, from among the plurality of first POIs and the plurality of second POIs, one or more third POIs to be displayed on a map screen, and a display module configured to render and display, on the map screen, the determined one or more third POIs and the floor polygon information.

Additional aspects of embodiments will be set forth in part in the description which follows and, in part, will be apparent from the description, or may be learned by practice of the disclosure.

According to embodiments, a method of providing an indoor map may provide a method of determining POIs to be displayed on a map screen among POIs of an indoor map and a background map.

According to embodiments, a method of providing an indoor map may not only configure an intuitive user input for viewing an indoor map through a user interface of a map screen, but also efficiently transmit and receive data related to the indoor map in a process of displaying the indoor map on an existing background map, thereby preventing a situation in which data overload is applied to a user terminal and accordingly, improving the user experience.

According to embodiments, a method of providing an indoor map may have an effect of preventing a malfunction such as a ghost click, in which a POI that is rendered on a map screen but not visible is incorrectly selected, from occurring even when a background map and an indoor map overlap.

The effects to be achieved are not limited to those described above, and other effects not mentioned above will be clearly understood by one of ordinary skill in the art from the following description.

BRIEF DESCRIPTION OF THE SEVERAL VIEWS OF THE DRAWINGS

The accompanying drawings illustrate desired embodiments of the present disclosure and are provided together with the detailed description for better understanding of the technical idea of the present disclosure. Therefore, the present disclosure should not be construed as being limited to the embodiments set forth in the drawings.

These and/or other aspects, features, and advantages of the disclosure will become apparent and more readily appreciated from the following description of embodiments, taken in conjunction with the accompanying drawings of which:

FIGS. 11A and 11B are diagrams illustrating priority values and popularities assigned to each of points of interest (POIs) for contention processing of the POIs, according to an embodiment; and FIG. 12 is a diagram illustrating a method of determining POIs to be rendered on a map screen based on artificial intelligence in a method of providing an indoor map, according to an embodiment.

DETAILED DESCRIPTION

Figure 1:
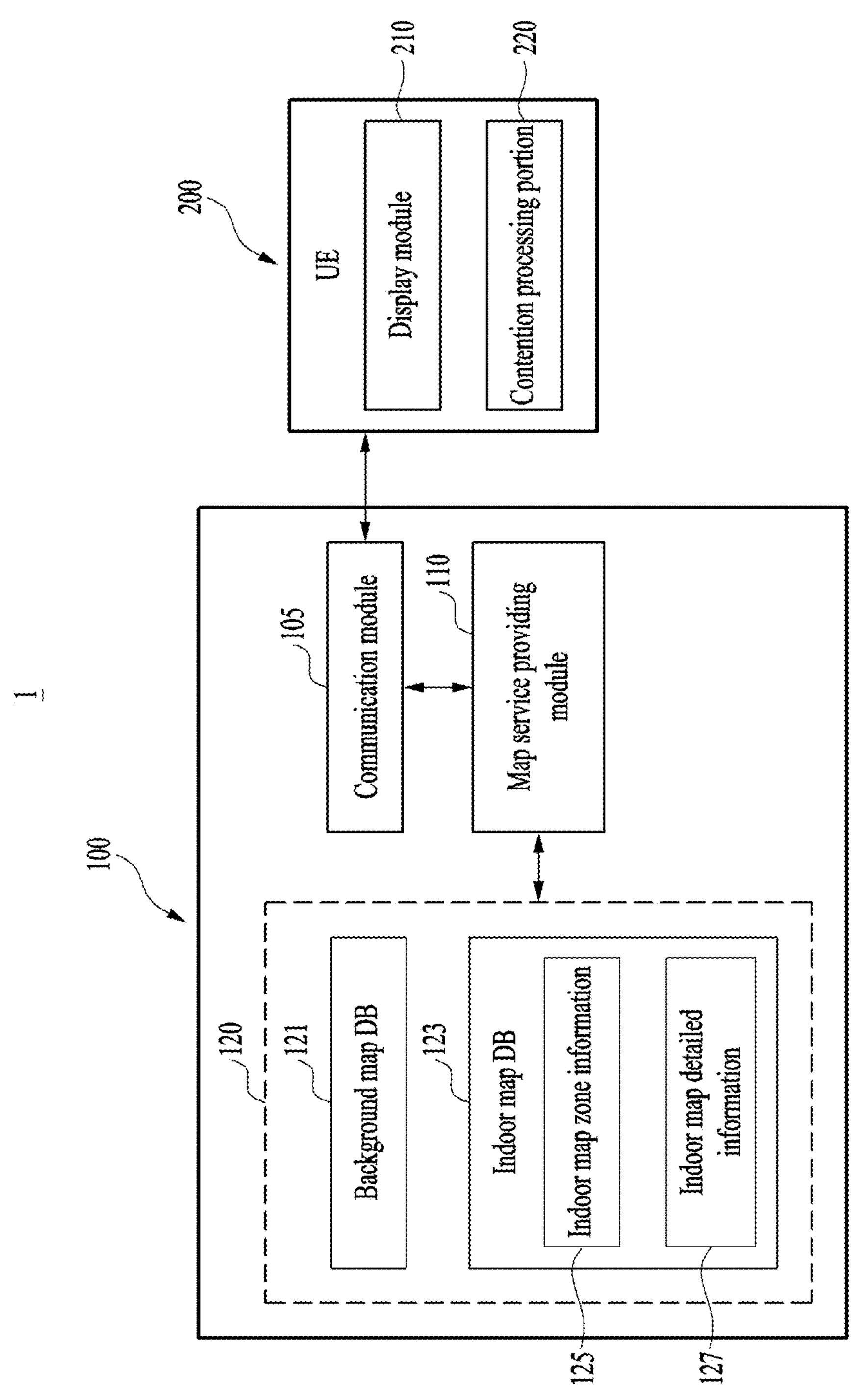
FIG. 1 is a diagram schematically illustrating a system for providing an indoor map according to an embodiment.

The various embodiments described in this specification are exemplified for the purpose of clearly explaining the technical idea of the present disclosure and are not intended to limit it to a specific embodiment. The technical idea of the present disclosure includes various modifications, equivalents, alternatives, and optional combinations of all or part of each embodiment described in the present specification. Furthermore, the scope of the technical ideas of the present disclosure is not limited to the various embodiments presented below or the specific descriptions thereof.

Unless otherwise defined, all terms including technical and scientific terms used herein have the same meaning as commonly understood by one of ordinary skill in the art to which example embodiments belong.

The expressions "comprises," "may include," "includes," "may have," "has," and "can have" used in this specification indicate the presence of a target feature (e.g., a function, an operation, or a component), but do not exclude the presence of other additional features. That is, such expressions should be understood as open-ended terms that imply the possibility of including a second embodiment.

It will be understood that the singular forms "a," "an," and "the" include plural referents unless the context clearly dictates otherwise. It will be understood that the singular forms "a," "an," and "the" include plural referents unless the context clearly dictates otherwise. It will be understood throughout the whole specification that, when one part "includes" or "comprises" one component, the part does not exclude other components but may further include other components, unless the context clearly dictates otherwise.

As used herein, the term "portion," "module," or "unit" refers to a software or hardware component that performs predefined functions. However, "unit" is not limited to software or hardware. The "unit" may be configured to reside on an addressable storage medium or configured to operate one or more processors. Thus, a "unit" may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionalities provided in the components and "units" may be combined into fewer components and "units" or may be further separated into additional components and "units."

According to one embodiment of the present disclosure, a 'module' or 'unit' may be implemented with a processor and a memory. 'Processor' should be broadly interpreted to include a general-purpose processor, a central processing unit (CPU), a microprocessor, a digital signal processor (DSP), a controller, a microcontroller, a state machine, and the like. In some contexts, a 'processor' may refer to an application-specific integrated circuit (ASIC), a programmable logic device (PLD), a field programmable gate array (FPGA), etc. A 'processor' may also refer to a combination of processing devices, such as, for example, a combination of a DSP and a microprocessor, a combination of multiple microprocessors, one or more microprocessors in conjunction with a DSP core, or any other such configuration. The term "memory" may refer to various types of processor-readable media, such as random access memory (RAM), read-only memory (ROM), non-volatile random access memory (NVRAM), programmable read-only memory (PROM), erase-programmable read-only memory (EPROM), electrically erasable PROM (EEPROM), flash memory, a magnetic or optical data storage device, registers, and the like. When the processor can read information from a memory and/or write information to the memory, the memory is stated to be in an electronic communication state with the processor. The memory integrated in the processor is in an electronic communication state with the processor.

As used herein, the expressions "first," "second," or "firstly," "secondly," and the like, unless the context clearly indicates otherwise, are used to refer to multiple similar objects and to distinguish one object from another, and do not limit the order or importance among the objects.

As used herein, the expressions "A, B, and C," "A, B, or C," "A, B, and/or C," or "at least one of A, B, and C," "at least one of A, B, or C," "at least one of A, B, and/or C," "at least one selected from A, B, and C," "at least one selected from A, B, or C," "at least one selected from A, B, and/or C," and the like can mean each of the listed items or all possible combinations of the listed items. For example, "at least one selected from A and B" can refer to (1) A, (2) at least one of A, (3) B, (4) at least one of B, (5) at least one of A and at least one of B, (6) at least one of A and B, (7) at least one of B and A, (8) both A and B.

The expression "based on" as used herein is used to describe one or more factors affecting a decision, act of judgment, or action described in a phrase or sentence containing the expression, and the expression does not exclude additional factors affecting the decision, act of judgment, or action.

As used herein, the expression that a component (e.g., a first component) is "connected" or "connected" to another component (e.g., a second component) may mean that the component is directly connected or connected to the other component, but also connected or connected via a new other component (e.g., a third component).

The expression "configured to" as used herein can have the meanings "set to do," "having the ability to do," "modified to do," "made to do," and "capable of doing," depending on the context. The expression is not limited to the meaning of "specifically designed in hardware." For example, a processor configured to perform a particular operation could mean a generic-purpose processor that can perform that particular operation by executing software.

Hereinafter, various embodiments of the disclosure will be described in detail with reference to the accompanying drawings. In the attached drawings and descriptions of the drawings, identical or substantially equivalent components may be given the same reference numerals. In addition, in the description of various embodiments below, duplicate description of identical or corresponding components may be omitted, but this does not mean that the corresponding components are not included in the embodiment.

FIG. 1 is a diagram schematically illustrating a system for providing an indoor map according to an embodiment.

Referring to FIG. 1, a system 1 for providing an indoor map may include a server 100 for providing map information and a user terminal (UE) 200 for executing a map application and, based on the map information provided by the server 100, displaying a map on a user interface of the map application on a display module 210.

The server 100 may include a communication module 105 for transmitting and receiving various data including map information to and from the UE 200, a map service providing module 110 for obtaining map information from a map database (DB) 120 and providing the map information to the UE 200, and the map DB 120 storing map information. The server 100 may be a general-purpose server for providing various services in addition to providing map services. However, for ease of description, content related to providing a map service is mainly described herein.

Map information may include an indoor map for at least some of a plurality of first points of interest (POIs) displayed on a background map, together with the background map displayed on the user interface of the map application running on the UE 200. The indoor map may not be provided for all first POIs, but may be provided for some first POIs for which an indoor map is available because the POIs have been designated in advance, for a reason such as being larger than a determined size or being affiliated with a server (or an entity that manages the server). For example, the first POIs for which an indoor map is provided may include, but are not limited to, a building or a structure including a shopping mall, a supermarket, an airport, an underground mall, and the like, consisting of one floor or two or more floors. On the other hand, even in a case of the first POIs for which an indoor map is available, the indoor map may not be provided for security reasons. In this case, the server 100 may be set to provide the indoor map only to a user with an access right.

The first POI for which an indoor map is provided may include a plurality of second POIs, and the map information in the present disclosure is a concept that includes up to the plurality of second POIs. For example, when a first POI is a shopping mall, the indoor map of the first POI may include various stores, restaurants, convenience facilities, and the like within the shopping mall as the plurality of second POIs. Likewise, the first POI may be a larger building or structure in which multiple second POIs are located, or in some cases, the first POI and the second POI may refer to a same location. The first POI and the second POI may each be indicated using an indicator (e.g., a marker) or an icon at a corresponding location on the map.

The map DB 120 may include a background map DB 121 that stores background map information and an indoor map DB 123 that stores indoor map information including indoor map zone information 125 and indoor map detailed information 127.

The background map information stored in the background map DB 121 may include a background map and a plurality of first POIs. Here, the background map may illustrate, with a line or a shape, a building, a road, and various facilities. Alternatively, depending on user settings, the background map may be a three-dimensional (3D) representation of a building, a road, and various facilities, or may be displayed using satellite photos, but is not limited thereto.

The plurality of first POIs may be pre-designated locations or may include a location affiliated through various contracts or promotions. The plurality of first POIs may include detailed information on a first POI as well as location information on the background map of the first POI. Accordingly, when a user selects an indicator (e.g., a marker) related to one of the plurality of first POIs on a map screen of the UE 200, detailed information of the selected first POI may be provided in a form of a place panel or the like.

The indoor map DB 123 may distinctively store the indoor map zone information 125 and the indoor map detailed information 127 as the indoor map information. The indoor map zone information 125 may include area information and floor information of a building or a structure that is a display target of the indoor map. Here, the area information of a building or a structure may refer to a polygon that represents an approximate shape of an indoor map of the building or the structure. The floor information of a building or a structure may be information indicating how many above-ground and underground floors the building or the structure consists of.

The indoor map detailed information 127 may include floor polygon information and a plurality of second POIs. Here, the floor polygon information may represent a structure of each floor with a shape, such as a polygon, or a line. In addition, the plurality of second POIs may be pre-designated locations or may include a location affiliated through various contracts or promotions. The plurality of second POIs may include detailed information of a second POI as well as location information on the indoor map (and the background map) of the second POI. Accordingly, when a user selects an indicator (e.g., a marker) or an icon for one of the plurality of second POIs on the map screen of the UE 200, detailed information of the selected second POI may be provided in a form of a place panel or the like. The plurality of second POIs included together with the floor polygon information in the indoor map detailed information 127 may be related to a specific floor associated with the floor polygon information.

Although it is illustrated in FIG. 1 that the map DB 120 is included in the server 100, a separate external server that builds at least one of the background map DB 121 or the indoor map DB 123 may be provided, and at least a portion of the map DB 120 may be maintained by the external server and provided to the server 100.

The map service providing module 110 may search and obtain map information to be provided to the UE 200 from the map DB 120 in response to a request of the UE 200. For example, the map service providing module 110 may receive, through the communication module 105, a request generated and transmitted by the UE 200 in response to a manipulation (e.g., an input of panning a map, zooming in or zooming out on a map, a location search, and the like) of the user on the user interface of the map application running on the UE 200, and the map service providing module 110 may provide map information corresponding to a map screen to be displayed on the user interface of the map application according to the request of the UE 200.

Although not shown, the server 100 may include a processor and a memory, and the memory may store computer-readable instructions to implement various functions of the server 100. The processor may implement various modules, including the map service providing module 110 of FIG. 1, by executing the computer-readable instructions. In addition, the memory may include the map DB 120 or may be configured separately from the map DB 120, but embodiments are not limited thereto.

The UE 200 may include the display module 210 and a contention processing portion 220. The display module 210 may be a module for processing the map information received from the server 100 and displaying a result of the processing as a map screen on the user interface of the map application running on the UE 200. For example, the display module 210 may display a background map, an indoor map, and a plurality of POIs on a map screen.

The contention processing portion 220 of the UE 200 may perform contention processing on POIs to be displayed on a map of the map application running on the UE 200 to determine one or more third POIs to be rendered on the map. The determining of the third POIs through contention processing between the POIs may be performed repeatedly whenever the map screen is updated by an input of panning a map, zooming in or zooming out on a map, searching for a location, and the like.

In an embodiment, the contention processing between POIs performed by the contention processing portion 220 may include contention processing between the first POIs on the background map.

In an embodiment, contention processing between POIs performed by the contention processing portion 220 may be performed after determining whether the plurality of second POIs displayed within the indoor map and the plurality of first POIs displayed on the background map according to a user input are displayed overlapping each other and when it is determined that the plurality of first POIs and the plurality of second POIs overlap each other.

In an embodiment, the contention processing between POIs performed by the contention processing portion 220 may be performed based on priority values assigned to each of the POIs. For example, when the background map and the indoor map overlap each other (i.e., when the indoor map is displayed on top of the background map), POIs to be displayed in an area in which the background map and the indoor map overlap may be determined based on the priority values assigned to each of the first POIs and the second POIs. In this case, for an area for which an indoor map is to be displayed with a priority value assigned to the second POIs on the indoor map set higher than a priority value assigned to the first POIs on the background map, the second POIs may be preferentially rendered and displayed compared to the first POIs.

In an embodiment, the contention processing between POIs performed by the contention processing portion 220 may be performed based on popularities assigned to each of the POIS as well as the priority values assigned to each of the POIs. Popularity of a POI may be calculated based on at least one of a number of searches for the POI by a specific user or an unspecified number of users, a number of requests for a direction to the POI, a number of times the POI is set as a favorite, or a number of times the POI is shared with friends. For example, contention processing may first be performed based on the priority values, and for POIs having a same priority value, contention processing may be performed based on the popularities.

In another embodiment, the contention processing between POIs performed by the contention processing portion 220 may be performed based on the popularities assigned to each of the POIs, and the priority values may not be considered.

In another embodiment, the contention processing between POIs performed by the contention processing portion 220 may be performed based on user data in addition to the priority values assigned to each of the POIs. Through the contention processing, a POI more personalized to an individual user may be provided based on information such as gender, age, visit/search history, favorite settings, and the like of the user. Such a recommendation based on user data may also be performed based on artificial intelligence through an artificial neural network module.

In still another embodiment, the contention processing between POIs performed by the contention processing portion 220 may be performed based on current location information of a user in addition to the priority values assigned to each of the POIs. For example, a user input zooming in on the map screen may not be an intention to view the indoor map, but rather an intention to check out nearby POIs around the user. Accordingly, the contention processing portion 220 may be set to display some of the POIs adjacent to a current location of the user, which may be identified by a global positioning system (GPS), even when priority values of the POIs are low.

That is, according to the design, POIs to be displayed on the map may be determined by the contention processing portion 220 based on at least one of the priority values and popularities, which are assigned to each of the POIs, and rendered accordingly, and POIs determined not to be displayed on the map may not be rendered on the map screen at all. Thus, even when the background map and the indoor map overlap each other, a malfunction, such as a ghost click by which a POI that (although rendered) is not visible on the map screen is unintentionally selected, or an error, such as some POIs being covered by the indoor map and only some other POIs being displayed, may be prevented.

The UE 200 may refer to any form of entity, or entities, in a system that has a mechanism for communicating with the server 100. The UE 200 may include a personal computer (PC), a laptop, a mobile terminal, a smartphone, a tablet PC, a wearable device, and the like, and may include all types of terminals that may access a wired/wireless network. Furthermore, the UE 200 may include any computing device implemented by at least one of an agent, an application programming interface (API), or a plug-in. In addition, the UE 200 may include an application source and/or a client application.

The server 100 and the UE 200 may be communicatively connected through a network (not shown). The network may refer to a connection structure in which information may be exchanged between each of nodes, such as a plurality of terminals and servers. For example, the network may include a local area network (LAN), a wide area network (WAN), the Internet (i.e., world wide web (WWW)), a wired or wireless data network, a telephone network, a wired or wireless television network, a controller area network (CAN), Ethernet, and the like. The wireless data communication network may include, but is not limited to, third-generation (3G), fourth-generation (4G), fifth-generation (5G), the Third Generation Partnership Project (3GPP), the Fifth Generation Partnership Project (5GPP), long-term evolution (LTE), World Interoperability for Microwave Access (WIMAX), Wireless Fidelity (Wi-Fi), the Internet, a LAN, a wireless LAN, a WAN, a personal area network (PAN), a radio frequency (RF), a Bluetooth network, a near-field communication (NFC) network, a satellite broadcasting network, an analog broadcasting network, a digital multimedia broadcasting (DMB) network, and the like.

Figure 2A:
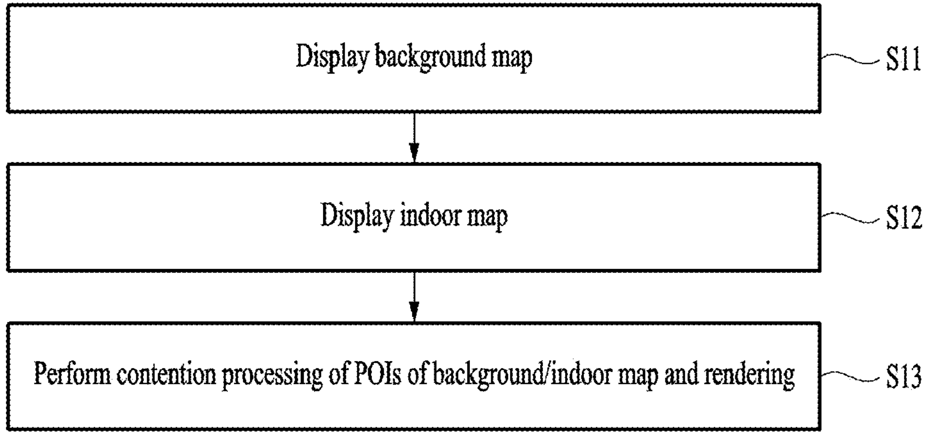
FIG. 2A is a flowchart schematically illustrating a method of providing an indoor map, according to embodiments.
Figure 2B:
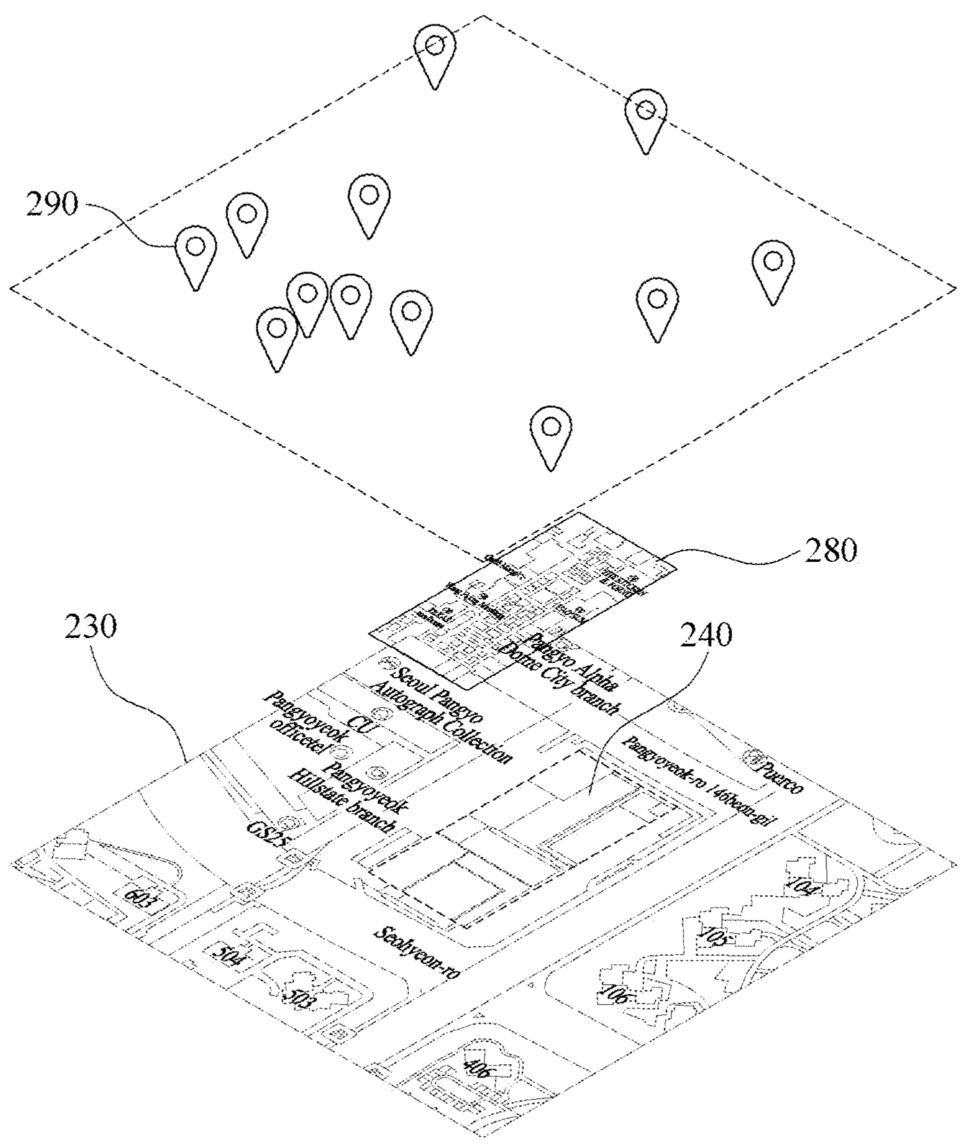
FIG. 2B is a conceptual diagram illustrating a method of providing an indoor map, according to embodiments.

FIG. 2A is a flowchart schematically illustrating a method of providing an indoor map, according to embodiments, and FIG. 2B is a conceptual diagram illustrating a method of providing an indoor map, according to embodiments.

Referring to FIGS. 2A and 2B, a method of providing an indoor map may include operation S11 in which the UE 200 may display a background map 230 and a plurality of first POIs. Background map information including the background map 230 and the plurality of first POIs may be received from the server 100, and the background map 230 and the plurality of first POIs may be displayed on a map screen, which may be a user interface of a map application running on the UE 200.

In operation S12, the UE 200 may display an indoor map 280 on the map screen. The indoor map 280 may include floor polygon information, which represents, with a shape or a line, a structure of a specific floor of a first POI 240 that is a display target of the indoor map 280, and a plurality of second POIs within the indoor map 280.

Information of the indoor map 280 may be obtained by requesting and receiving, by the UE 200, the information of the indoor map 280 from the server 100, in response to receiving a user input. As described in more detail below, the information of the indoor map 280 may include at least one of indoor map zone information or indoor map detailed information.

In operation S13, the UE 200 or the server 100 may perform contention processing of the plurality of first POIs of the background map 230 and the plurality of second POIs of the indoor map 280 to determine one or more third POIs to be rendered on the map screen from among the plurality of first POIs and the plurality of second POIs. In addition, the determined one or more third POIs may be rendered and displayed on the map screen of the UE 200.

According to the method of providing an indoor map, after contention processing is performed on the POIs (i.e., the plurality of first POIs and the plurality of second POIs) while the background map and the indoor map are displayed, the third POIs to be rendered on the map screen may be determined, rendered, and displayed. Thus, even when the background map and the indoor map overlap each other, a malfunction, such as a ghost click by which a POI that (although rendered) is not visible on the map screen is unintentionally selected, or an error, such as some of the POIs of the background map being obscured by the indoor map and only the others of the POIs of the background map being displayed, may be prevented.

Hereinafter, specific aspects of the method of providing an indoor map are described with reference to FIGS. 3 to 5.

Figure 3:
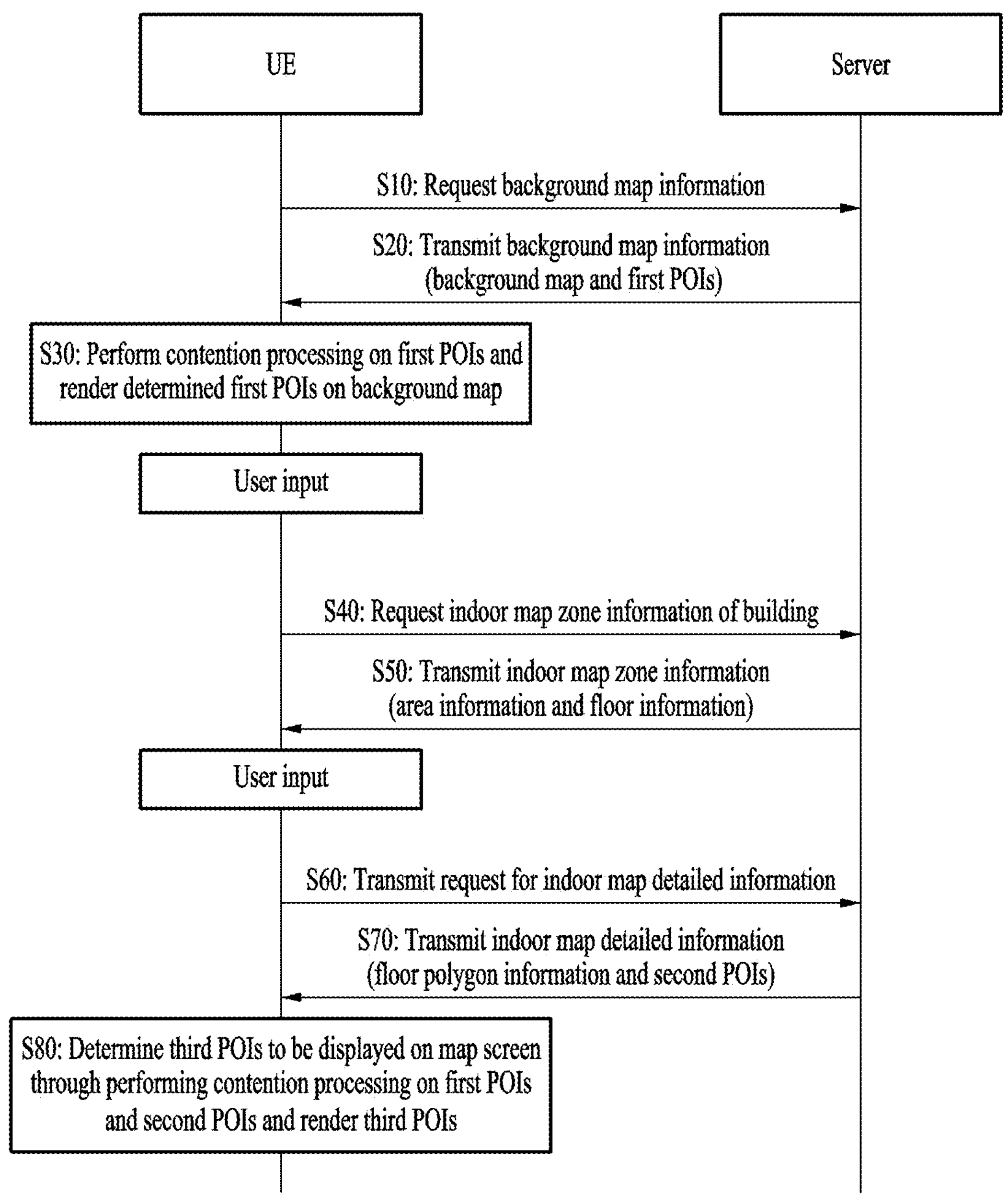
FIG. 3 is a flowchart illustrating a method of providing an indoor map, according to an embodiment.

FIG. 3 is a flowchart illustrating a method of providing an indoor map, according to an embodiment.

Referring to FIG. 3, in operation S10, the UE 200 may transmit a request for background map information in response to a map application being executed. In addition, the UE 200 may transmit the request for background map information when a map screen needs to be updated in response to the map screen being panned, zoomed in, or zoomed out by a user input. The server 100 may receive the request for background map information from the UE 200.

The background map information may include a background map and a plurality of first POIs. Here, the background map may illustrate, with a line or a shape, a building, a road, and various facilities. Alternatively, depending on user settings, the background map may be a 3D representation of a building, a road, and various facilities, or may be displayed using satellite photos, but is not limited thereto. The plurality of first POIs may be pre-designated locations or may include a location affiliated through various contracts or promotions. The plurality of first POIs may include detailed information of a first POI as well as a location information on the background map of the first POI.

Each of the plurality of first POIs may be assigned at least one of a priority value or popularity. The priority value may be pre-assigned by an administrator. The popularity may be calculated based on at least one of a number of searches for a POI, a number of requests for a direction to the POI, a number of times the POI is set as a favorite, or a number of times the POI is shared with friends. However, a method of calculating popularity may vary and is not limited thereto.

In operation S20, the server 100 may transmit the background map information to the UE 200 in response to the request for the background map information. The UE 200 may receive the background map information transmitted by the server 100.

Figure 6:
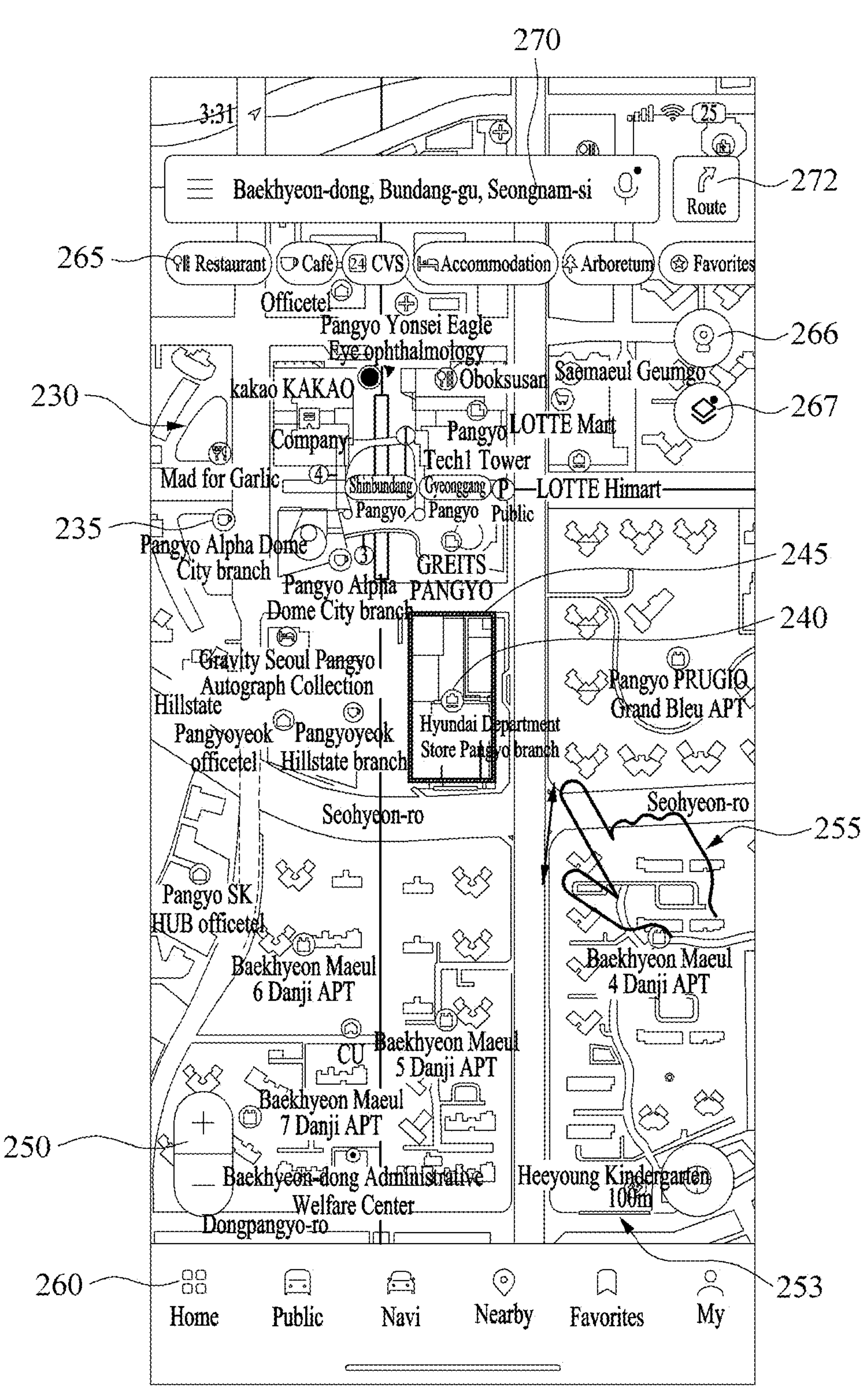
FIGS. 6 to 10 are diagrams illustrating a process of displaying an indoor map on a map screen, according to an embodiment.

In operation S30, the UE 200 may perform contention processing on the plurality of first POIs included in the background map information and may subsequently determine and render first POIs to be displayed on the background map. Here, the contention processing between POIs may be performed based on the priority value, or based on at least one of the priority value or the popularity, which are assigned to each of the POIs. Alternatively, the contention processing may be performed by considering user data, a current location of the user, and the like. Referring to FIG. 6, first POIs 235, among the plurality of first POIs, which are rendered after the contention processing, are rendered and displayed on the map screen of the map application.

Referring again to FIG. 3, in operation S40, the UE 200 may transmit a request for indoor map zone information to the server 100 in response to receiving a first user input intended to display an indoor map on the map screen. Accordingly, the server 100 may receive the request for indoor map zone information from the UE 200. The request for indoor map zone information may be generated and transmitted only when an indoor map feature is enabled in the settings of the map application.

Figure 4:
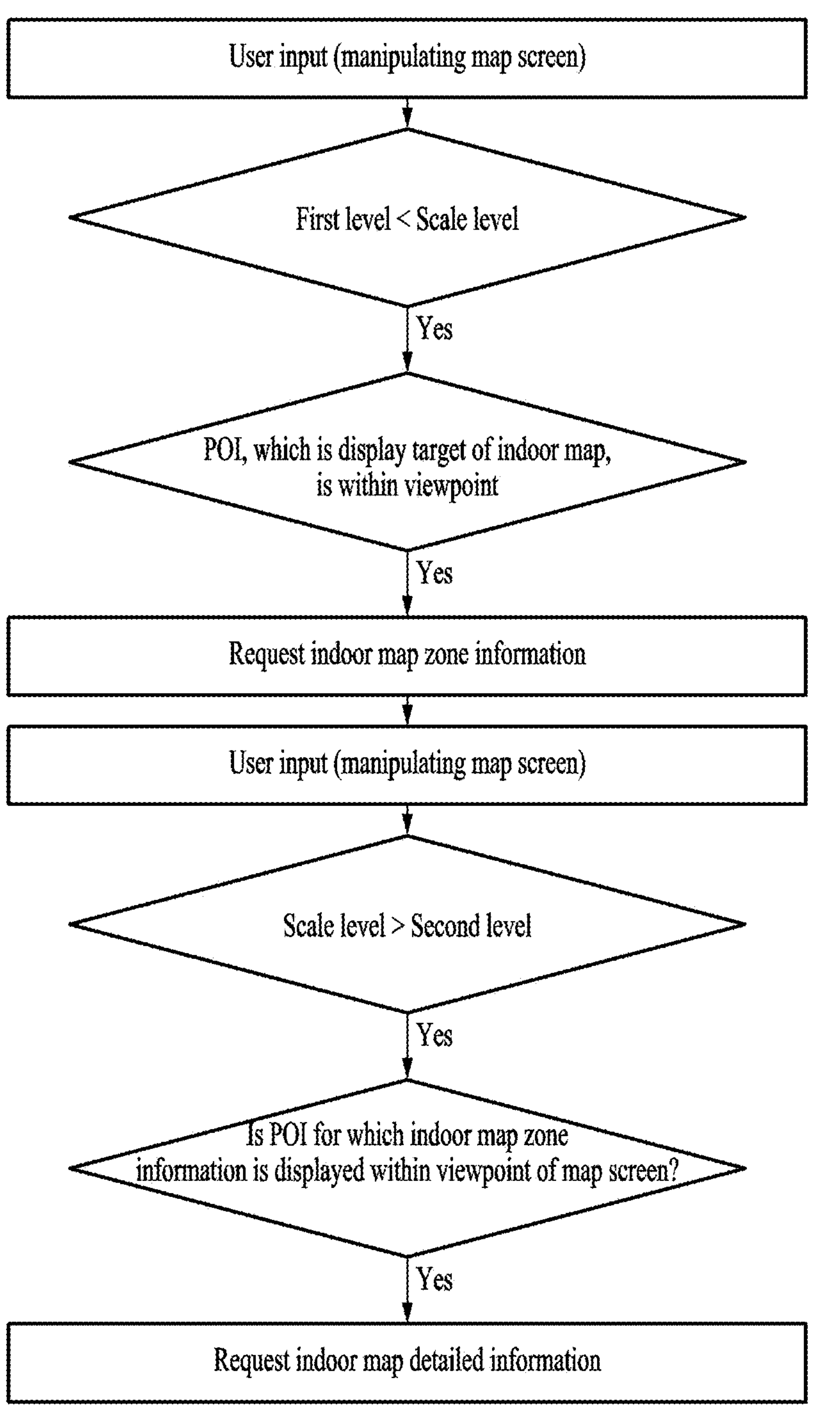
FIG. 4 is a flowchart illustrating a process of requesting map information from a server based on a user input for a map screen, according to an embodiment.

FIG. 4 is a flowchart illustrating a process of requesting map information from a server based on a user input for a map screen, according to an embodiment.

Referring to FIG. 4, a first user input (i.e., a manipulation of the map screen) may be an input that increases a scale level of the map screen to be greater than or equal to a pre-specified first level and causes a first POI, for which an indoor map may be displayed, to be within a viewpoint (or a field of view) of the map screen. In response to the first user input, the UE 200 may generate a request for indoor map zone information and transmit the request to the server.

However, when a condition for the scale level and the viewpoint is not met, the request for indoor map zone information may not be transmitted. That is, when the scale level of the map screen is less than the first level even when the user zooms in on the map screen, or when the scale level of the map screen is greater than or equal to the first level but no POIs, for which an indoor map may be displayed, are within the viewpoint of the map screen, the UE 200 may not transmit the request for indoor map zone information.

In an embodiment, the first user input intended to display an indoor map on the map screen may include at least one of an input of selecting a zoom button displayed on the map screen, a touch input resulting from an intention of the user to zoom in on the map screen (e.g., a pinching motion of the user spreading or closing the fingers on the touch screen), or an input intended to move a POI, for which an indoor map may be displayed, to the viewpoint of the map screen (e.g., an input of the user panning the map screen). The first user input may consist of a single input or a combination of multiple inputs sequentially applied.

In another embodiment, the first user input intended to display an indoor map on the map screen may include using a separate selection button to enter the indoor map. For example, the indoor map may be accessed by, for example, selecting an "indoor map button" provided in a place panel that appears when the user selects a determined POI. When selecting the indoor map button, the scale level of the map screen may be set to automatically change to be greater than or equal to the first level or a second level described below.

In an embodiment, indoor map zone information may include area information and floor information of a building or a structure corresponding to the first POI that is a display target of the indoor map. Here, the area information of a building or a structure may include a polygon that represents an approximate shape of an indoor map of the building or the structure. For example, referring to FIG. 6, it may be confirmed that the UE 200 displays area information 245 of the first POI 240, which is the display target of the indoor map, in a form of a polygon (a rectangle in the example of FIG. 6) on the map screen of the map application, based on the indoor map zone information (i.e., the area information) received from the server 100. Here, the polygon that represents the area information 245 may not display the indoor map but only represent an approximate shape of the indoor map.

Figure 7:
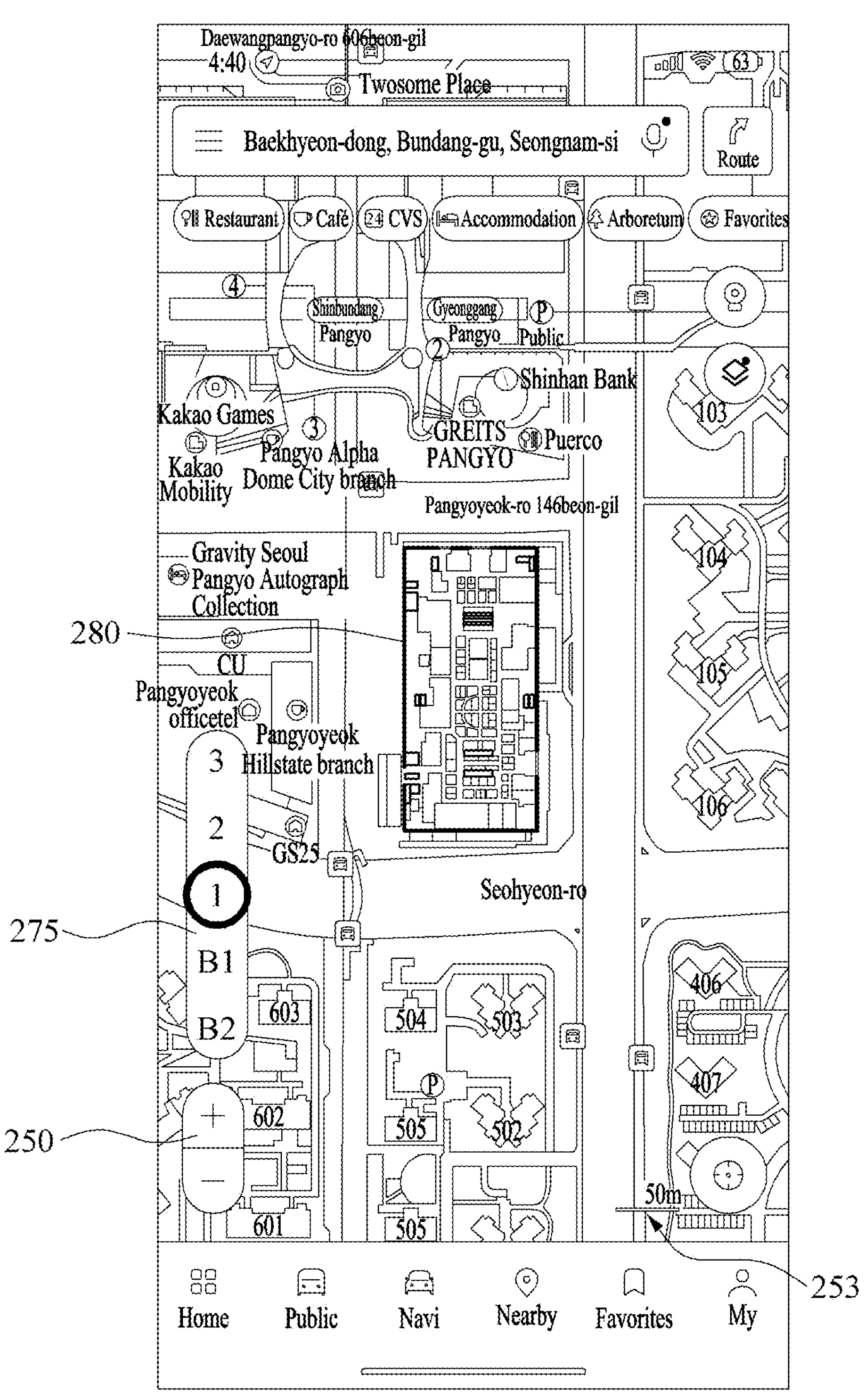

The floor information included in the indoor map zone information may be information indicating how many above-ground and underground floors the building or the structure consists of. Referring to FIG. 7, the UE 200 may display a floor level display area 275 in an area of the map screen, for example, a bottom left area, based on the indoor map zone information (i.e., the floor information) received from the server 100.

Referring again to FIG. 3, in operation S50, the server 100 may transmit indoor map zone information to the UE 200 in response to the request for indoor map zone information. Accordingly, the UE 200 may receive the indoor map zone information from the server 100 and may display the area information 245 of the indoor map zone information at a corresponding location on the background map (i.e., a first POI for which an indoor map is to be displayed).

As described above, according to the method of providing an indoor map, by inserting an intermediate step of displaying the area information 245 (and the floor information) that is based on the indoor map zone information before displaying the indoor map (i.e., the indoor map detailed information) on the map screen, the user may recognize that the corresponding POI (i.e., a building) is a place for which an indoor map may be displayed and consequently, a more intuitive manipulation of the user interface may be provided. In addition, from the perspective of the server 100, inserting the intermediate step may prevent transmission of the indoor map detailed information having a relatively large data volume to the UE 200 before the user makes an input clearly intended to view the indoor map, which causes unnecessary excessive data transmission and reception and affects operation speed of the application.

In operation S60, by a second user input, the UE 200 may generate a request for indoor map detailed information and transmit the request to the server 100. Accordingly, the server 100 may receive the request for indoor map detailed information from the UE 200.

Referring to FIG. 4, the second user input may be an input for setting the scale level of the map screen to be greater than or equal to a pre-specified second level and for causing a first POI, which is a display target of the indoor map, and in some cases, a first POI, for which indoor map zone information is displayed (i.e., a POI for which a polygon based on area information is displayed), to be within a viewpoint of the map screen. When the second user input satisfies this condition, the UE 200 may generate a request for indoor map detailed information. Here, the second level in terms of the scale level of the map screen may refer to a higher scale level (i.e., a state in which the map screen is more zoomed) than the first level described above with respect to the indoor map zone information.

In addition, the second user input may be the same as or different from the first user input described above with respect to the indoor map zone information. That is, the user may cause the first POI, which is the display target of the indoor map, to be within the viewpoint of the map screen and change the scale level of the map screen from less than the first level to greater than or equal to the second level with a single input. In this case, the first user input and the second user input may be one consecutive input. In this case, both indoor map zone information and indoor map detailed information of the first POI may be requested with a single user input.

When the first POI, which is the display target of the indoor map, is a multi-story building, a request for indoor map detailed information may include designated floor information, which is information of a user-designated floor. That is, the request for indoor map detailed information may not be a request for indoor map detailed information of an entire floor of a multi-story building, but rather a request for indoor map detailed information of a user-designated floor or a default floor. Here, default floor information that is requested when there is no user-designated floor information may be, for example, information of a floor having a main entrance accessible from the road. Depending on the building, the floor having a main entrance may be set to various levels, such as the 1st floor, lobby (L) floor, B1 floor, or the like, so information of each POI may include information on the main entrance.

When there are two or more first POIs, for which an indoor map may be displayed, within the viewpoint of the map screen with a scale level greater than or equal to the second level, only indoor map detailed information of a first POI, among the first POIs, that is closest to a center of the map screen may be requested.

As described above, a request for indoor map detailed information may be transmitted on a floor-by-floor basis, which may prevent an increase in the amount of data transmission and reception, which results from transmitting and receiving indoor map detailed information of all floors of a multi-story building all at once, and an occurrence of a momentary overload in the UE 200 to process the data transmission and reception. In addition, when indoor map detailed information is updated by the server 100, information may be updated on a floor-by-floor basis and it is not necessary to update all information of the entire building, so the amount of data used during an update may be reduced.

In operation S70, the server 100 may transmit indoor map detailed information to the UE 200 in response to the request for indoor map detailed information. Accordingly, the UE 200 may receive the indoor map detailed information.

Figure 9:
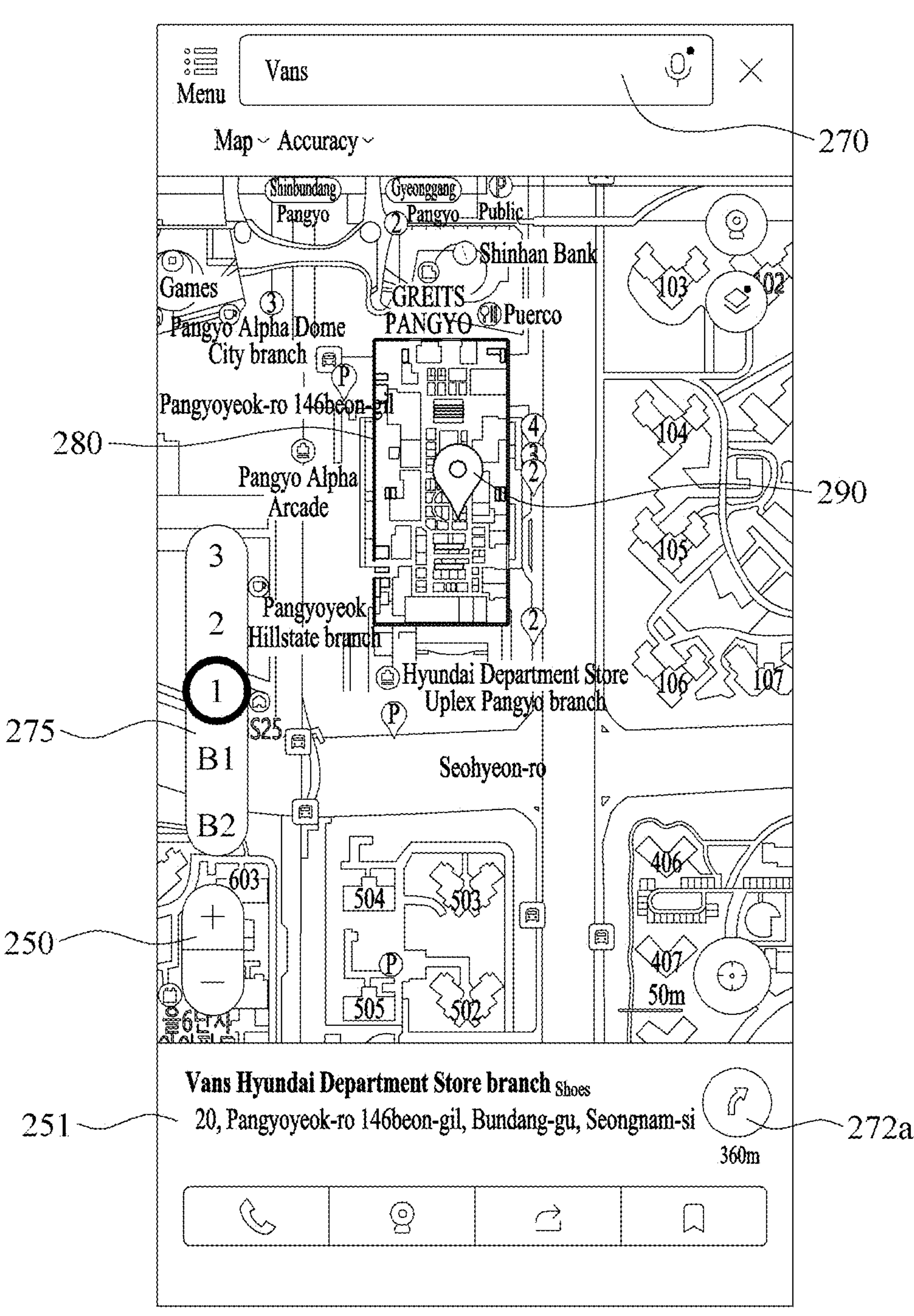

The indoor map detailed information may include floor polygon information and a plurality of second POIs. Here, the floor polygon information may represent a structure of the floor designated by the user or the floor set by default with a shape, such as a polygon, or a line. In addition, the plurality of second POIs may be pre-designated locations or may include a location affiliated through various contracts or promotions. The plurality of second POIs may include detailed information on a second POI as well as a location information on the indoor map (and the background map) of the second POI. Accordingly, as illustrated in FIG. 9, when a user selects one of the plurality of second POIs on the map screen of the UE 200, an indicator (e.g., a marker) 291 for the selected second POI may be displayed, and detailed information of the selected second POI may be provided in a form of a place panel 251 or the like.

In operation S80, the UE 200 may determine one or more third POIs to be displayed on the map screen through performing contention processing on the plurality of second POIs included in the received indoor map detailed information and a plurality of first POIs included in the background map and may render and display, on the map screen, the one or more third POIs and the floor polygon information. For example, referring to FIG. 8, one or more third POIs 290 are displayed on a map screen including the indoor map 280. However, the floor polygon information may be displayed on the map screen before the third POIs are determined. The order of display is not limited thereto.

Contention processing between the plurality of first POIs and the plurality of second POIs may be performed after determining whether the plurality of second POIs and the plurality of first POIs displayed on the map screen according to a user input overlap each other and when it is determined that the plurality of first POIs and the plurality of second POIs overlap each other.

The contention processing between the plurality of first POIs and the plurality of second POIs may be performed based on priority values, popularities, or both priority values and popularities, which are assigned to each of the POIs. For example, contention processing may first be performed based on the priority values, and for POIs having a same priority value, contention processing may be performed based on the popularities. For example, the popularities may be updated periodically, and among POIs having the same priority value, such as restaurants or stores in a same building, POIs to be displayed on the map screen may be determined based on the popularities.

In one embodiment, the priority values assigned to the plurality of second POIs may be set higher than the priority values assigned to the plurality of first POIs, and accordingly, the second POIs may be preferentially rendered in a first area in which the background map and the indoor map overlap.

However, even for points corresponding to points on the background map, some points including a point in which a closed-circuit television (CCTV) is installed, a point in which relevant information (e.g., an accident) has occurred, a point set as a "favorite" by the user, and the like may be assigned a higher priority value than the second POIs. In addition, among points on the indoor map, public facilities, such as a restroom, an elevator, stairs, an escalator, and a medical facility, and convenience facilities, such as an information desk and a stroller rental station, may be assigned a relatively higher priority value than the second POIs within the indoor map and thus set to be constantly (or preferentially) displayed. However, the priority values assigned to each point may be changed by an administrator as needed without limitation.

In another embodiment, contention processing between the plurality of first POIs and the plurality of second POIs may be performed by considering not only priority values and popularities but also user data and a current location of the user.

A number of third POIs to be displayed on the map screen may be pre-specified. For example, a number of POIs to be displayed on the entire map screen may be limited, or a number of POIs to be displayed in a determined area may be limited to avoid cluttering the map screen.

As described above, according to the method of providing an indoor map, a POI determined not to be displayed on the map due to a reason such as a low priority value may not be rendered on the map at all. Thus, even when the background map and the indoor map overlap each other, a ghost click by which a POI (in the background map) that is not visible on the map screen is unintentionally selected or an error, such as some POIs of the background map being partially obscured by the indoor map, may be prevented.

Figure 5:
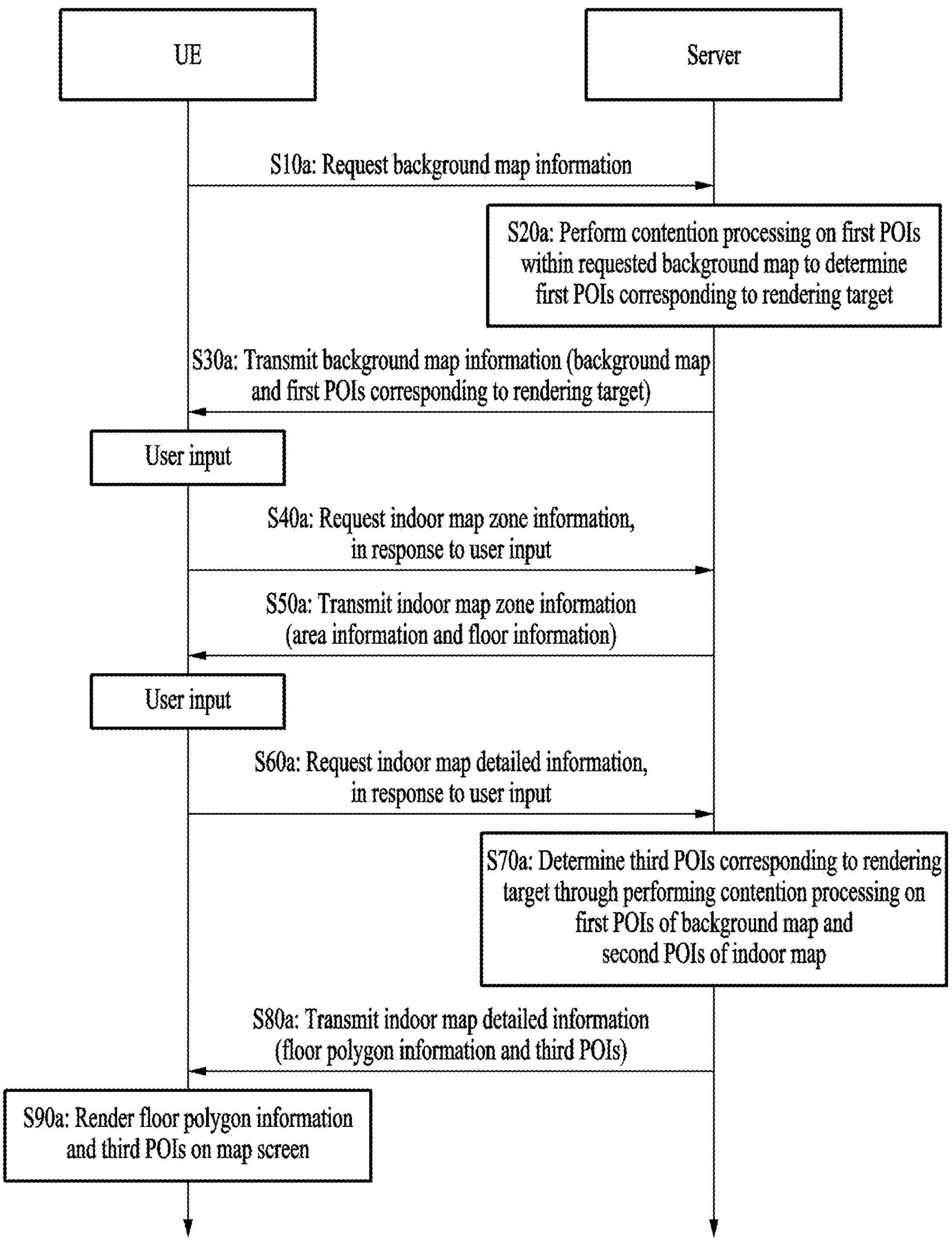
FIG. 5 is a flowchart illustrating a method of providing an indoor map, according to an embodiment.

FIG. 5 is a flowchart illustrating a method of providing an indoor map, according to an embodiment.

In the case of a second embodiment described with reference to FIG. 5, compared to a first embodiment described above with reference to FIG. 3, the server 100, instead of the UE 200, may perform contention processing between POIs and transmit POIs determined to be rendered on a map screen to the UE 200. Hereinafter, a duplicate description with the first embodiment is omitted, and differences therebetween are mainly explained.

Referring to FIG. 5, in operation S10*a*, the UE 200 may transmit a request for background map information in response to an execution of a map application by a user or when an update to a map screen is needed as the user manipulates the map screen. The server 100 may receive the request for background map information from the UE 200.

In operation S20*a*, the server 100 may obtain, in response to the request for background map information, a background map from the background map DB 121 and may perform contention processing on first POIs within the background map to determine first POIs corresponding to a rendering target, which may be rendered on the background map. That is, according to the second embodiment, the server 100 may perform contention processing of POIs to be rendered on the background map and transmit, to the UE 200, only the first POIs corresponding to the rendering target. Thus, there is an advantage in that operations to be performed by the UE 200 may be reduced.

In operation S30*a*, the server 100 may transmit background map information, that is, the background map and the first POIs corresponding to the rendering target, to the UE 200. The UE 200 may receive the background map information transmitted by the server 100 and may render and display, on the map screen, the background map and the first POIs corresponding to the rendering target.

In operation S40*a*, the UE 200 may transmit a request for indoor map zone information to the server 100 in response to receiving a first user input intended to display an indoor map on the map screen. The first user input may be an input or a combination of inputs for increasing a scale level of the map screen to be greater than or equal to a pre-specified first level and for causing first POIs, for which an indoor map may be displayed, to be within a viewpoint of the map screen. The server 100 may receive the request for indoor map zone information from the UE 200.

In operation S50*a*, the server 100 may transmit indoor map zone information to the UE 200 in response to the request for indoor map zone information. Accordingly, the UE 200 may receive the indoor map zone information from the server 100 and display area information included in the indoor map zone information at a corresponding location (i.e., a first POI for which an indoor map is to be displayed) on the background map.

In operation S60*a*, in response to the second user input, the UE 200 may generate and transmit a request for indoor map detailed information. The second user input may be an input or a combination of inputs for causing the scale level of the map screen to be greater than or equal to a second level, which may be greater than the pre-specified first level, and for causing first POIs, for which indoor map zone information is displayed (i.e., POIs for which a polygon based on the area information is displayed), to be within the viewpoint of the map screen. The server 100 may receive the request for indoor map detailed information from the UE 200.

In operation S70*a*, the server 100 may determine one or more third POIs to be displayed on the map screen through performing contention processing on a plurality of first POIs of the background map and a plurality of second POIs of the indoor map of the first POIs, wherein the plurality of second POIs is received in response to the request for indoor map detailed information. The contention processing between the plurality of first POIs and the plurality of second POIs may be performed based on at least one of a priority value assigned to each of the POIs, popularity assigned to each of the POIs, user data, or a current location of the user.

In operation S80*a*, the server 100 may transmit indoor map detailed information, that is, floor polygon information and one or more third POIs, to the UE 200. Accordingly, the UE 200 may receive the indoor map detailed information.

In operation S90*a*, the UE 200 may render and display, on the map screen, the floor polygon information and the one or more third POIs.

FIGS. 6 to 10 are diagrams illustrating a process of displaying an indoor map on a map screen, according to an embodiment.

Hereinafter, a user interface of a map application, that is, a configuration of a map screen during execution of a method of providing an indoor map, is described in more detail with reference to FIGS. 6 to 10.

First, referring to FIG. 6, when a user executes the map application through the UE 200, a map screen for a default location, a current location of the user, or a location that the user has previously viewed through the map application may be provided. The background map 230 and the plurality of first POIs 235 may be displayed on the map screen. The first POIs 235 may include, for example, stores, restaurants, beauty shops, residential buildings, and public facilities such as subway stations.

As illustrated in FIG. 6, when a scale level of the map screen is greater than or equal to a pre-specified first level and one or more first POIs 240, for which an indoor map may be displayed, are within a viewpoint (or a field of view) of the map screen, the area information 245 (for example, a polygonal shape such as a rectangle) for the one or more first POIs 240, for which an indoor map may be displayed, may be displayed.

In an embodiment, when there are two or more first POIs, for which an indoor map may be displayed, within the viewpoint of the map screen having a scale level greater than or equal to the first level, only the area information 245 of a first POI, among the first POIs, that is closest to a center of the map screen may be displayed.

In addition, a zoom button 250 for zooming in or out on the map screen may be provided at a bottom left of the map screen. The user may zoom in or out of the map screen using a touch input 255, such as pinching two fingers apart or together, without using the zoom button 250.

Also, at a bottom of the map screen, a shortcut button tray 260 including a plurality of shortcut buttons for entering a setting screen or a function, such as home, public transportation, navigation, user information, and the like, may be provided. Furthermore, a scale bar 253 may be displayed at a bottom right of the map screen.

In addition, a search window 270 for searching for a location or a place may be provided at a top of the map screen, and a route search button 272 for entering a route search service that provides a function to guide a route to a desired place may be provided on a right side of the search window 270. At the bottom of the search window 270, a category selection button 265 may be provided to indicate categories related to places, such as a restaurant, a cafe, a convenience store, accommodation, and an arboretum. When a specific category button, for example, a restaurant category button, is selected, POIs corresponding to the restaurant category may be displayed on the map screen. In addition, the map screen may include a button 266 for viewing a 3D street view of a selected point and a map settings button 267 for setting a view on the map and the like.

Referring to FIG. 7, when the user zooms in on a map screen of FIG. 6 by using the zoom button 250, the touch input 255, or the like and a scale level of the map screen becomes greater than or equal to a second level (which is higher than a first level), the indoor map 280 (i.e., floor polygon information) for one first POI within a viewpoint, for which an indoor map may be displayed, may be displayed.

In an embodiment, when an indoor map is displayed on a map screen, the floor level display area 275 of a building or a structure, for which the indoor map is being displayed, may be displayed at a bottom left of the map screen. In this case, not only a floor, for which the indoor map (i.e., floor polygon information) is being displayed, may be highlighted (e.g., circled), but also the floor may be positioned at a center of the floor level display area 275. For example, in the example of FIG. 7, the indoor map of a first floor is displayed, and the first floor, for which the indoor map is being displayed, is highlighted and displayed at the center of the floor level display area 275. The user may change the floor of the indoor map by scrolling the floor level display area 275 or touching/clicking a desired floor. While the floor level display area 275 displays five floors in the example of FIG. 7, when the map screen is reduced since a configuration such as a place panel of a determined POI is displayed on the map screen, only three floors may be displayed. Also, in the case of a single-story building, the floor level display area 275 may not be displayed at all, or in the case of a two-story building, only two floors may be displayed.

Furthermore, in the example of FIG. 7, only the indoor map 280 (i.e., floor polygon information) for the first POI is displayed, and a plurality of second POIs within the indoor map 280 are not displayed. This may be a display state when the scale level of the map screen is at a specific level greater than or equal to the second level. However, a state in which only an indoor map is displayed and POIs within the indoor map are not displayed, as the example of FIG. 7, may not be implemented depending on settings of the map application.

In an embodiment, when there are two or more first POIs, for which an indoor map may be displayed, within the viewpoint of a map screen having a scale level greater than or equal to the second level, only the indoor map 280 of a first POI, among the two or more first POIs, that is closest to the center of the map screen may be displayed.

Figure 8:
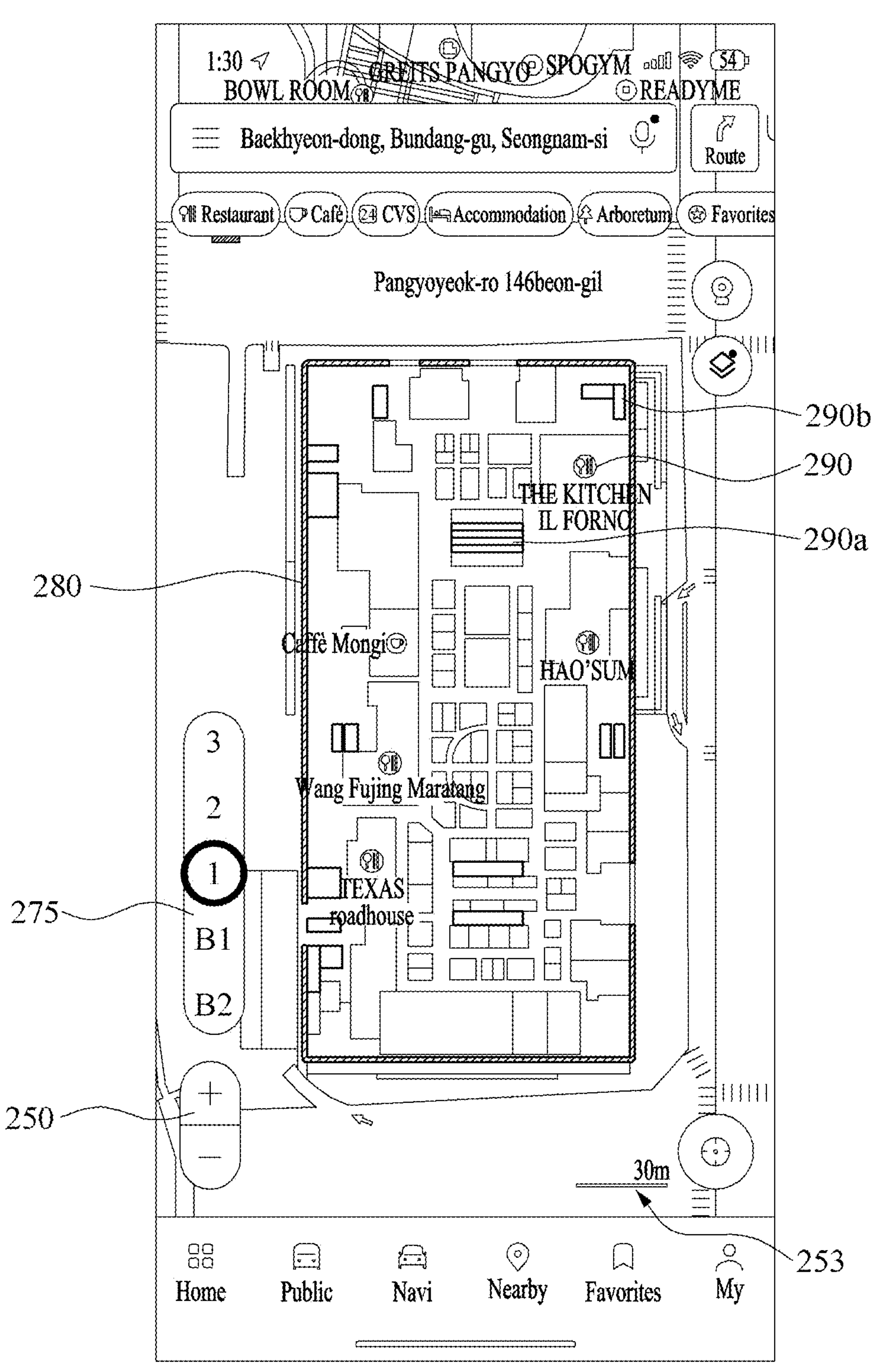

In addition, referring to FIG. 8, when the user further zooms in on a map screen of FIG. 7 by using the zoom button 250, the touch input 255, or the like and a scale level of the map screen becomes greater than or equal to a second level (which is a scale level higher than the scale level of the map screen of FIG. 7 in the examples of FIGS. 7 and 8), the indoor map 280 for one first POI within the viewpoint, for which an indoor map may be displayed, and the one or more third POIs 290 in the indoor map 280 may be displayed together.

The one or more third POIs 290 displayed within the indoor map 280 may have been determined by contention processing to be displayed on the map screen. As described above, the UE 200 may determine the one or more third POIs 290 to be displayed on the map screen through the contention processing on a plurality of second POIs included in received indoor map detailed information and a plurality of first POIs included in a background map and may render and display the one or more third POIs 290 on the map screen. Here, the contention processing between POIs may be performed based on at least one of a priority value assigned to each of the POIs, popularity assigned to each of the POIs, user data, or a current location of the user.

Public facilities 290*a*, such as a restroom, an elevator, stairs, an escalator, a medical facility, and convenience facilities 290*b*, such as an information desk and a stroller rental station, may be assigned a relatively higher priority value than the second POIs and thus set to be constantly (or preferentially) displayed. In the case of points with high priority values, such as the public facilities 290*a* and the convenience facilities 290*b*, transmission and reception may be set to occur all at once at the beginning rather than every time the map screen is updated. That is, in some embodiments, the public facilities 290*a* and the convenience facilities 290*b* may be classified as places having different characteristics from the second POIs (e.g., a store, a restaurant, a cafe, and the like) and may thus be assigned different priority values.

Referring to FIG. 9, when a user selects a desired second POI within the indoor map 280 through the map screen of FIG. 8 or through a search using a search window, an indicator (e.g., a marker) 291 for the selected second POI may be displayed, and the place panel 251 for viewing detailed information on the selected second POI may be provided. The place panel 251 may be expanded through scrolling or the like, and when expanded, more detailed information on the place may be displayed. In addition, a route search button 272*a* may be provided in the place panel 251. When the route search button 272*a* is selected, a function to guide a route to the selected second POI may be provided through a route search service of the map application.

Figure 10:
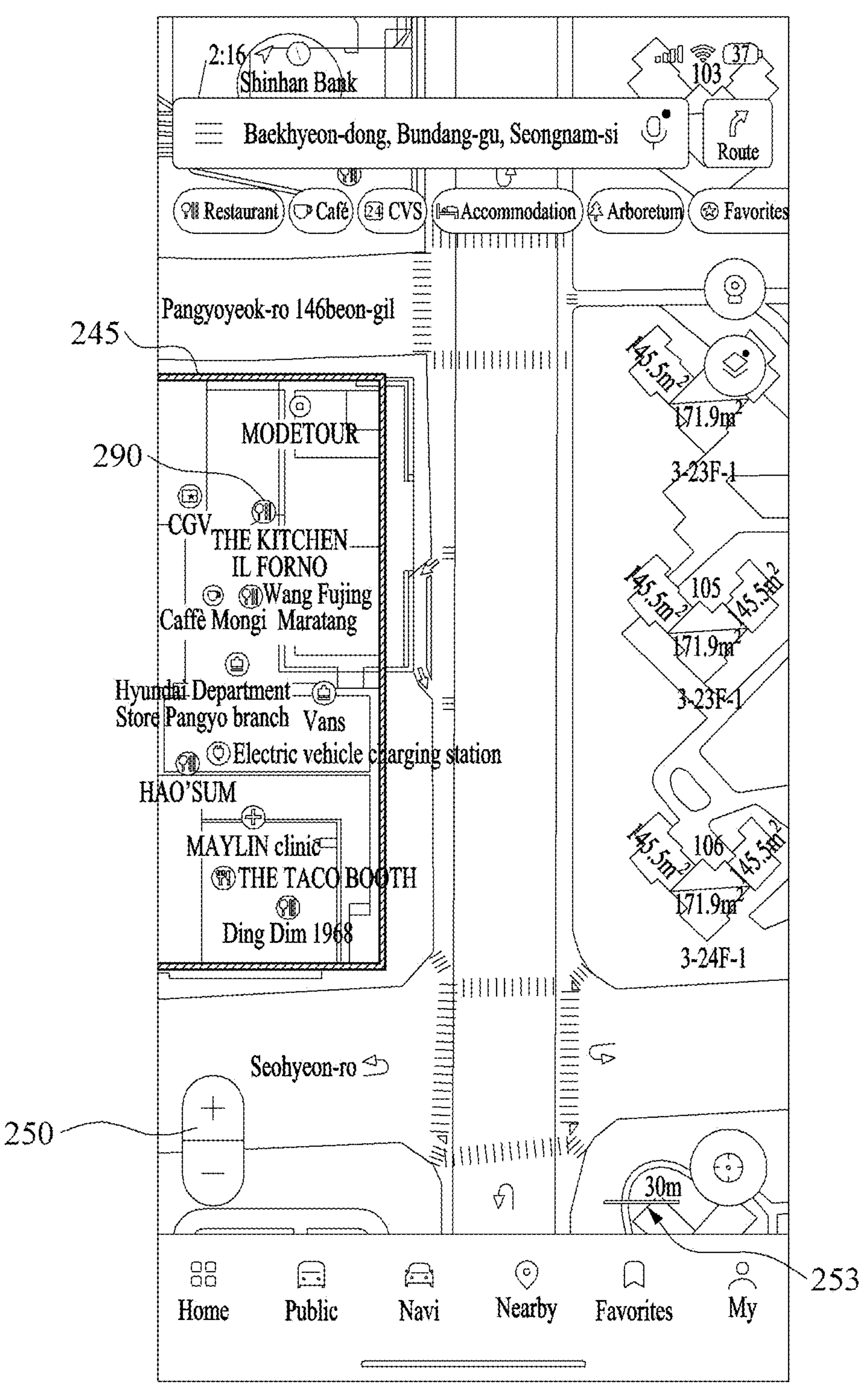

Referring to FIG. 10, when the user pans the map screen of FIG. 8 and an indoor map moves out of a center of a map screen, or when the map screen is reduced by using the zoom button 250, the touch input 255, or the like and a scale level becomes less than a first level, a display of the indoor map may be terminated. When the indoor map moves out of the center of the map screen as in the example of FIG. 10, only the area information 245 of the indoor map may be displayed instead of the indoor map even when the scale level of the map screen is greater than or equal to the second level. In addition, the plurality of third POIs 290 in the indoor map in this case may be rendered and displayed after performing contention processing on POIs of the entire building rather than POIs of each floor. In another embodiment, when the indoor map moves out of the center of the map screen, only background map information (i.e., a background map and a plurality of first POIs) may be displayed, and indoor map information may not be displayed.

When a user repeats a state of displaying an indoor map and a state of not displaying an indoor map by manipulating the map screen, a floor of a last displayed indoor map may be configured to be displayed again next time an indoor map is displayed.

FIGS. 11A and 11B are diagrams illustrating priority values and popularities assigned to each of POIs for contention processing of the POIs, according to an embodiment.

First, referring to FIG. 11A, each of places, locations, facilities, and the like that may be displayed on a map screen of a map application may have a pre-assigned priority value.

A priority value (e.g., 2110) of POIs (i.e., second POIs) of an indoor map may be given a higher priority value than a priority value (e.g., 180) of general POIs (i.e., first POIs). Accordingly, in a first area in which a background map and the indoor map overlap each other, the second POIs may be preferentially rendered, and the first POIs may not be rendered except in an exceptional case.

In addition, some places on the background map, such as a CCTV (e.g., 4030), accident information (e.g., 4020), major cities and counties (e.g., 4010), and POIs designated as a favorite (e.g., 3000), may be given higher priority values than the POIs of the indoor map and may thus be preferentially (or constantly) displayed even when the indoor map and the background map overlap each other.

However, settings of the priority values may be changed by an administrator and are not limited thereto.

Referring to FIG. 11B, among the POIs of the indoor map, which have a same priority value, POIs to be displayed on the map screen may be selected based on the popularities. In a non-limiting example, a POI having higher popularity may be set to be preferentially selected as a POI to be displayed on the map screen. The popularity may be calculated based on at least one of a number of searches for a POI, a number of requests for a direction to the POI, a number of times the POI is set as a favorite, or a number of times the POI is shared with friends, and may be periodically updated.

FIG. 12 is a diagram illustrating a method of determining POIs to be rendered on a map screen based on artificial intelligence in a method of providing an indoor map, according to an embodiment.

Referring to FIG. 12, the UE 200 or the server 100 may include an artificial neural network module 300. After a pre-training session, the artificial neural network module 300 may, in an inference session, receive at least one of user data 320 or popularity data 330 as an input together with map information 310 and, based on the received user data 320 or the received popularity data 330, output POI determination data 350 for determining a POI to be displayed on the map screen. Also, depending on the design, the artificial neural network module 300 may further receive information on a current location of a user.

Such an artificial neural network module may include at least one of artificial neural network modules, such as a Transformer, a Long-Short Term Memory (LSTM), a recurrent neural network (RNN), a convolutional neural network (CNN), a generative adversarial network (GAN), or an AutoEncoder (AE). Alternatively, a machine learning model, such as a multi-layer perceptron, a Naive-Bayesian Classification, or a Random Forest Classification, may be used.

More specifically, in the pre-training session of the artificial neural network module 300, data for pre-training may be provided as an input to the artificial neural network module 300. The data for pre-training may include at least one of the map information 310, the user data 320, or the popularity data 330 collected over a determined period of time.

Here, the map information 310 may include background map information, indoor map information, and a plurality of POIs. The user data 320 may include a gender, an age, a visit/search history, and the like of each user, and data of multiple users may be collected for a pre-training purpose. The popularity data 330 may be calculated based on at least one of a number of searches for a POI, a number of requests for a direction to the POI, a number of times the POI is set as a favorite, or a number of times the POI is shared with friends. However, there are no limitations on a method of obtaining such data or specific types thereof.

In addition, the artificial neural network module 300 may output the POI determination data 350, based on the input pre-training data. The POI determination data 350 that is output in the pre-training session may correspond to a non-optimized result. Accordingly, the POI determination data 350 that is output by the artificial neural network module 300 in the pre-training session may be compared with ground truth 360. For example, the ground truth 360 may be predetermined by an administrator.

As a result of the comparison, the artificial neural network module 300 may be pre-trained so that a loss function (e.g., $-\Sigma y_i \log p_i$) between the POI determination data 350 and the ground truth 360 may be minimized. For example, the artificial neural network module 300 may adopt a method of updating the weight of the hidden layer based on the loss function or an error between the POI determination data 350 and the ground truth 360. That is, the data for pre-training may be input to each node of input layers such as x1, x2, and x3 and pass, based on a weight such as w1, through hidden layers such as h1, h2, and h3, and the POI determination data 350 predicted based on a cost function such as softmax may be output to an output layer, which is y1. Furthermore, based on the error ($-\Sigma y_i \log p_i$) between the POI determination data 350 and the ground truth 360, the weight of the artificial neural network module 300 may be updated by back propagation.

After the pre-training session is completed, in the inference session, when at least one of the map information 310, the user data 320, or the popularity data 330 is input as input data to an artificial neural network module 300*a* that is pre-trained, the POI determination data 350 may be output based on the input data.

However, an implementation method of an artificial neural network module may allow various modifications and is not limited to the implementation method described above.

It is obvious that each of steps or operations of the method according to the embodiments of the present disclosure may be performed by a computer including one or more processors according to an execution of a computer program stored in a computer-readable storage medium.

Computer-executable instructions stored in the aforementioned storage medium may be implemented through a computer program programmed to perform each of the steps. The computer program may be stored in a computer-readable storage medium and executable by a processor. The computer-readable storage medium may be a non-transitory readable medium. Here, the non-transitory readable medium may refer to a medium that is readable by a device and that stores data semi-permanently, not for a short period of time like a register, a cache, or a memory. Specifically, programs for performing the various methods described above may be provided stored in non-transitory readable media, such as semiconductor memory devices such as erasable programmable read-only memory (EPROM), electrically erasable programmable read-only memory (EEPROM), and a flash memory device, magnetic disks such as an internal hard disk and a removable disk, an optical-magnetic disk, and non-volatile memory including compact disc read-only memory (CD-ROM) and digital versatile disc ROM (DVD-ROM) disks.

A method according to the various embodiments of the present disclosure may be provided included in a computer program product. The computer program product may be distributed in the form of a machine-readable storage medium (e.g., a CD-ROM) or distributed online via an application store (e.g., PlayStore™). When distributed online, at least part of the computer program product may be temporarily generated or at least temporarily stored in a storage medium such as memory of a server of a manufacturer, a server of the application store, or a relay server.

As described above, one of ordinary skill in the art will appreciate that the present disclosure may be implemented in other specific forms without changing the technical spirit or essential characteristics thereof. Therefore, it should be understood that the embodiments described above are illustrative and not restrictive in all respects. The scope of the present disclosure is indicated by the claims described below rather than the detailed description, and all changes or modifications derived from the meaning and scope of the claims and equivalent concepts should be interpreted as being included in the scope of the present disclosure.

The features and advantages described in this specification are not all inclusive, and many additional features and advantages will become apparent to one of ordinary skill in the art by considering the drawings, specification, and the claims. Furthermore, it should be noted that the language used in this specification has been selected primarily for readability and teaching purposes and may not have been selected to delineate or circumscribe the subject matter of the present disclosure.

The above description of the embodiments of the present disclosure has been provided for illustrative purposes. The above description is not intended to make the present disclosure limited to a precise form disclosed or without any omission. One of ordinary skill in the art will appreciate that many modifications and variations may be made in light of the above disclosure.

Therefore, the scope of the present disclosure is not limited by the detailed description but by the claims of an application based on the detailed description. Accordingly, the embodiments of the present disclosure are only illustrative and do not limit the scope of the present disclosure, which is set forth in the claims below.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of providing an indoor map, the method comprising:

transmitting, in response to a request for background map information, the background map information to a user terminal, wherein the background map information comprises a background map and a plurality of first points of interest (POIs);

receiving a request for indoor map detailed information for at least one first POI, among the plurality of first POIs, which is a display target of an indoor map;

determining, based on priority values of the plurality of first POIs and priority values of a plurality of second POIs of the indoor map of the at least one first POI, one or more third POIs to be displayed on a map screen; and transmitting the indoor map detailed information to the user terminal, wherein the indoor map detailed information comprises floor polygon information of the first POI, which is a display target of an indoor map, and the determined one or more third POIs.

2. The method of claim 1, wherein the request for the indoor map detailed information comprises:

designated floor information for the at least one first POI.

3. The method of claim 1, wherein the floor polygon information of the indoor map detailed information represents, with a shape or a line, a structure of a specific layer of the at least one first POI, and the plurality of second POIs of the indoor map detailed information comprises:

location information associated with a map of each of the second POIs and detailed information on each of the second POIs.

4. The method of claim 1, further comprising:

transmitting, in response to a request for indoor map zone information, the indoor map zone information, wherein the indoor map zone information comprises area information and floor information of a building or a structure corresponding to the first POI that is a display target of an indoor map.

5. The method of claim 4, wherein the area information included in the indoor map zone information comprises:

a polygon that represents a shape of the indoor map of the first POI, which is a display target of the indoor map, and the floor information included in the indoor map zone information indicates how many above-ground floors and underground floors are included in the first POI that is a display target of an indoor map.

6. The method of claim 1, wherein the priority values assigned to the plurality of second POIs are set higher than the priority values assigned to the plurality of first POIs so that the plurality of second POIs is preferentially rendered in an area in which the background map and the indoor map overlap each other.

7. A method of providing an indoor map, the method comprising:

displaying, on a map screen, a background map and a plurality of first points of interest (POIs);

transmitting, in response to receiving a user input, a request for indoor map detailed information;

receiving the indoor map detailed information, wherein the indoor map detailed information comprises floor polygon information of a first POI, which is a display target of an indoor map, and a plurality of second POIs;

determining, based on priority values of the plurality of first POIs and priority values of the plurality of second POIs of the indoor map of the at least one first POI, one or more third POIs to be displayed on the map screen; and rendering and displaying, on the map screen, the determined one or more third POIs and the floor polygon information.

8. The method of claim 7, wherein the request for the indoor map detailed information comprises:

designated floor information for the first POI that is a display target of an indoor map.

9. The method of claim 7, wherein the user input causes at least part of the first POI, among the plurality of first POIs, which is a display target of an indoor map, to be within a viewpoint of the map screen and changes a scale level of the map screen to be greater than or equal to a pre-specified level.

10. The method of claim 7, further comprising:

prior to the transmitting of the request for the indoor map detailed information, requesting, in response to receiving the user input, indoor map zone information, wherein the indoor map zone information comprises:

area information and floor information of a building or a structure corresponding to the first POI that is a display target of an indoor map.

11. The method of claim 10, wherein the user input related to the request for the indoor map zone information is an input that increases a scale level of the map screen to be greater than or equal to a pre-specified level and that causes at least part of the first POIs, for which is able to be displayed on the indoor map, to be within a viewpoint of the map screen.

12. The method of claim 7, wherein the determining of the one or more third POIs comprises:

performing contention processing based on popularities assigned to each of the plurality of first POIs and the plurality of second POIs.

13. The method of claim 12, wherein the popularity is calculated based on at least one of a number of searches for a POI, a number of requests for a direction to the POI, a number of times the POI is set as a favorite, or a number of times the POI is shared with friends.

14. The method of claim 7, wherein the priority values assigned to the plurality of second POIs are set higher than the priority values assigned to the plurality of first POIs so that the plurality of second POIs is preferentially rendered in an area in which the background map and the indoor map overlap each other.

15. The method of claim 7, wherein priority values assigned to a public facility and a convenience facility displayed within the floor polygon information is higher than the priority values assigned to the plurality of second POIs.

16. The method of claim 7, further comprising:

determining whether a plurality of second POIs and a plurality of first POIs displayed on the map screen after the user input overlap each other, wherein the determining of the one or more third POIs is performed when it is determined that the plurality of first POIs and the plurality of second POIs overlap each other.

17. The method of claim 9, wherein the transmitting of the request for the indoor map detailed information comprises:

when there are two or more first POIs, for which an indoor map is able to be displayed, within the viewpoint of the map screen having the scale level higher than or equal to a pre-specified level, transmitting the request for indoor map detailed information of a first POI closest to a center of the map screen.

18. The method of claim 7, wherein the determining of the one or more third POIs is repeatedly performed whenever the map screen is updated.

19. A server for providing an indoor map, the server comprising:

a map database configured to store map information; and a map service providing module configured to obtain map information from the map database and provide the map information to a user terminal, wherein the map service providing module is configured to:

transmit, in response to a request for background map information from the user terminal, the background map information to the user terminal, wherein the background map information comprises a background map and a plurality of first points of interest (POIs);

in response to a request for indoor map detailed information for at least one first POI, among the plurality of first POIs received from the user terminal, which is a display target of an indoor map, determine one or more third POIs to be displayed on a map screen, based on priority values of the plurality of first POIs and priority values of a plurality of second POIs of the indoor map of the at least one first POI; and transmit indoor map detailed information to the user terminal, wherein the indoor map detailed information comprises floor polygon information of the first POI, which is a display target of an indoor map, and the plurality of second POIs.

20. A user terminal for providing an indoor map, the user terminal comprising:

at least one processor; and a memory configured to store instructions, wherein, when executed by the at least one processor, the instructions cause the user terminal to perform:

displaying, on a map screen, a background map and a plurality of first points of interest (POIs);

transmitting, in response to receiving a user input, a request for indoor map detailed information;

receiving the indoor map detailed information, wherein the indoor map detailed information comprises floor polygon information of a first POI, which is a display target of an indoor map, and a plurality of second POIs;

determining, based on priority values of the plurality of first POIs and priority values of the plurality of second POIs of the indoor map of the at least one first POI, one or more third POIs to be displayed on the map screen; and rendering and displaying, on the map screen, the determined one or more third POIs and the floor polygon information.

* * * * *